(12) United States Patent
Babaei et al.

(10) Patent No.: US 10,681,738 B2
(45) Date of Patent: Jun. 9, 2020

(54) RANDOM ACCESS IN A WIRELESS DEVICE AND WIRELESS NETWORK

(71) Applicants: Alireza Babaei, Fairfax, VA (US); Esmael Hejazi Dinan, Herndon, VA (US)

(72) Inventors: Alireza Babaei, Fairfax, VA (US); Esmael Hejazi Dinan, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 3 days.

(21) Appl. No.: 15/845,687

(22) Filed: Dec. 18, 2017

(65) Prior Publication Data

US 2018/0176961 A1 Jun. 21, 2018

Related U.S. Application Data

(60) Provisional application No. 62/435,548, filed on Dec. 16, 2016.

(51) Int. Cl.
*H04W 74/08* (2009.01)

(52) U.S. Cl.
CPC .... *H04W 74/0833* (2013.01); *H04W 74/0808* (2013.01)

(58) Field of Classification Search
None
See application file for complete search history.

(56) References Cited

U.S. PATENT DOCUMENTS

| 2015/0057011 | A1* | 2/2015 | Di Girolamo | H04W 74/0808 455/454 |
| 2018/0048498 | A1* | 2/2018 | Stern-Berkowitz | H04L 5/0048 |
| 2018/0279386 | A1* | 9/2018 | Liu | H04W 74/0808 |
| 2019/0037608 | A1* | 1/2019 | Harada | H04W 16/14 |
| 2019/0281636 | A1* | 9/2019 | Liu | H04W 72/0446 |

OTHER PUBLICATIONS

3GPP TS 36.211 V14.0.0 (Sep. 2016); 3rd Generation Partnership Project; Technical Specification Group Radio Access Network; Evolved Universal Terrestrial Radio Access (E-UTRA); Physical channels and modulation (Release 14)L.
(Continued)

*Primary Examiner* — Sai Aung
*Assistant Examiner* — Liem H. Nguyen
(74) *Attorney, Agent, or Firm* — David Grossman; Kavon Nasabzadeh; Philip Smith

(57) ABSTRACT

A wireless device receives a message from a first base station. The message comprises first configuration parameters for cells. Cells comprise cell groups. Cell groups comprise a first cell group for communication with the first base station, and a second cell group for communication with a second base station. The second cell group comprises an LAA cell, and RACH(s) configuration parameters for a RACH of the LAA cell. The wireless device performs an LBT procedure to transmit a preamble via the RACH of the LAA cell in response to initiating a random access process. The wireless device increments a counter in response to the LBT procedure indicating that the channel is occupied and determining a failure of the random access process in response to the counter reaching a first value. The wireless device transmits second message in response to the failure of the random access process.

20 Claims, 27 Drawing Sheets

(56) References Cited

OTHER PUBLICATIONS

3GPP TS 36.212 V14.0.0 (Sep. 2016); 3rd Generation Partnership Project; Technical Specification Group Radio Access Network; Evolved Universal Terrestrial Radio Access (E-UTRA); Multiplexing and channel coding (Release 14).
3GPP TS 36.213 V14.0.0 (Sep. 2016); 3rd Generation Partnership Project; Technical Specification Group Radio Access Network; Evolved Universal Terrestrial Radio Access (E-UTRA); Physical layer procedures (Release 14).
3GPP TS 36.300 V14.0.0 (Sep. 2016); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14).
3GPP TS 36.321 V14.0.0 (Sep. 2016); 3rd Generation Partnership Project; Technical Specification Group Radio Access Network; Evolved Universal Terrestrial Radio Access (E-UTRA); Medium Access Control (MAC) protocol specification (Release 14).
3GPP TS 36.331 V14.0.0 (Sep. 2016); 3rd Generation Partnership Project; Technical Specification Group Radio Access Network; Evolved Universal Terrestrial Radio Access (E-UTRA); Radio Resource Control (RRC); Protocol specification (Release 14).
IEEE 802 Interim Session; Atlanta, USA; Jan. 11-16, 2015; 3GPP & unlicensed spectrum; Dino Fiore, Chairman of 3GPP TSG-RAN (Qualcomm Technologies Inc.).
R1-160358; 3GPP TSG RAN WG1 Meeting #84; St Julian's, Malta, Feb. 15-19, 2016; Source: CATT; Title: Support of PRACH for LAA Scell; Agenda Item: 7.3.1.4; Document for: Discussion/Decision.
R1-160564; 3GPP TSG RAN WG1 Meeting #84; R1-160564; St Julian's, Malta, Feb. 15-19, 2016; Agenda item: 7.3.1.4; Souce: Samsung; Title: Discussion on RA procedure for UL LAA; Document for: Discussion/ Decision.
R1-160565; 3GPP TSG RAN WG1 Meeting #84; St Julian's, Malta, Feb. 15-19, 2016; Agenda item: 7.3.1.4; Source: Samsung; Title: Discussion on PRACH for UL LAA; Document for: Discussion.
R1-160625; 3GPP TSG RAN WG1 meeting #84; St Julian's, Malta, Feb. 15-19, 2016; Agenda Item: 7.3.1.4; Source: LG Electronics; Title: Random access in LAA; Document for: Discussion and decision.
R1-160797; 3GPP TSG-RAN WG1 Meeting 84; Feb. 15-19, 2016, St Julian's, Malta; Source: Panasonic; Title: PRACH on Unlicensed Carriers; Agenda Item: 7.3.1.4; Document for: Discussion.
R1-160883; 3GPP TSG RAN WG1 Meeting #84; St Julian's, Malta; Feb. 15-19, 2016; Agenda item: 7.2.1.2.2; Source: Qualcomm Incorporated; Title: Random Access Channel Design; Document for: Discussion and Decision.
R1-160950; 3GPP TSG RAN WG1 Meeting #84; St Julian's, Malta, Feb. 15-19, 2016; Source: NTT DOCOMO, Inc.; Title: Discussion on PRACH for eLAA UL; Agenda Item: 7.3.1.4; Document for: Discussion and Decision.
R1-160961; 3GPP TSG RAN WG1 Meeting #84; St Julian's, Malta, Feb. 15-19, 2016; Agenda item: 7.3.1.4; Source: Coolpad; Title: Discussion on PUSCH and PRACH for eLAA; Document for: Discussion and Decision.
R1-160975; 3GPP TSG RAN WG1 Meeting #84; St Julian's, Malta, Feb. 15-19, 2016; Source: MediaTek Inc.; Title: Considerations on PRACH for LAA; Agenda Item: 7.3.1.4; Document for: Discussion.
R1-160999; 3GPP TSG-RAN WG1#84; St Julian's, Malta, Feb. 15-19, 2016; Source: Ericsson; Title: PRACH Design for Enhanced LAA; Agenda Item: 7.3.1.4; Document for: Discussion and Decision.
R1-162132; 3GPP TSG RAN WG1 Meeting #84bis; Busan, Korea Apr. 11-15, 2016; Agenda Item: 7.3.1.4; Source: Huawei, HiSilicon; Title: PRACH for eLAA; Document for: Discussion and decision.
R1-162145; 3GPP TSG RAN WG1 Meeting #84bis; Busan, Korea, Apr. 11-15, 2016; Agenda Item: 8.1.1; Source: Huawei, HiSilicon; Title: Overview of Radio Access Mechanism for 5G; Document for Discussion and decision.
R1-162263; 3GPP TSG RAN WG1 Meeting #84bis; Busan, Korea Apr. 11-15, 2016; Source: CATT; Title: Support of PRACH for Rel-14 eLAA; Agenda Item: 7.3.1.4; Document for: Discussion/Decision.
R1-162326; 3GPP TSG RAN WG1 Meeting #84bis; Busan, Korea Apr. 11-15, 2016; Agenda Item: 7.3.1.4; Source: ZTE Microelectronics Technology, Nubia Technology; Title: PRACH Design for LAA; Document for: Discussion and Decision.
R1-162358; 3GPP TSG RAN WG1 Meeting #84bis; Busan, Korea, Apr. 11-15, 2016; Agenda Item: 7.3.1.4; Source: Intel Corporation; Title: PRACH Design for eLAA; Document for: Discussion/Decision.
R1-162470; 3GPP TSG RAN WG1 meeting #84bis; Busan, Korea, Apr. 11-15, 2016; Agenda Item: 7.3.1.4; Source: LG Electronics; Title: Random access preamble in LAA; Document for: Discussion and decision.
R1-162471; 3GPP TSG RAN WG1 meeting #84bis; Busan, Korea, Apr. 11-15, 2016; Agenda Item: 7.3.1.4; Source: LG Electronics; Title: Random access procedure in LAA; Document for: Discussion and decision.
R1-162527; 3GPP TSG RAN WG1 Meeting #84bis; Busan, Korea Apr. 11-15, 2016; Agenda item: 7.3.1.4; Source: HTC; Title: Discussion on PRACH design for LAA; Document for: Discussion / Decision.
R1-162619; 3GPP TSG RAN WG1 Meeting #84bis; Busan, Korea, Apr. 11-15, 2016; Agenda Item: 5; Source: Huawei, HiSilicon; Title: PRACH enhancement in high speed scenario; Document for Discussion and decision.
R1-162668; 3GPP TSG RAN WG1 #84bis; Busan, Korea, Apr. 11-15, 2016; Agenda item: 7.3.1.4; Source: Samsung; Title: PRACH Transmission Aspects; Document for: Discussion and Decision.
R1-162669; 3GPP TSG RAN WG1 Meeting #84bis; Busan, Korea Apr. 11-15, 2016; Agenda item: 7.3.1.4; Source: Samsung; Title: Discussion on enhanced random access procedure for UL LAA; Document for: Discussion.
R1-162803; 3GPP TSG RAN WG1 Meeting #84bis; Busan, Korea, Apr. 11-15, 2016; Source: NTT DOCOMO, Inc.; Title: Discussion on PRACH for eLAA UL; Agenda Item: 7.3.1.4; Document for: Discussion and Decision.
R1-162919; 3GPP TSG-RAN WG1 Meeting #84bis; Busan, South Korea, Apr. 11-15, 2016; Agenda item: 7.3.1.4; Source: Nokia, Alcatel-Lucent Shanghai Bell; Title: Discussion on PRACH design for eLAA; Document for: Discussion and Decision.
R1-162940; 3GPP TSG RAN WG1 Meeting #84bis; Busan, Korea, Apr. 11-15, 2016; Source: MediaTek Inc.; Title: PRACH design in eLAA; Agenda Item: 7 3 1 4; Document for Discussion.
R1-162995; 3GPP TSG RAN WG1 Meeting #84bis; Busan, Korea, Apr. 11-15, 2016; Agenda item: 7.3.1.4; Source: Coolpad; Title: Discussion on PRACH for eLAA; Document for: Discussion and Decision.
R1-163026; 3GPP TSG RAN WG1 #84bis; Apr. 11-15, 2016; Busan, Korea; Agenda item: 7.3.1.4; Source: Qualcomm Incorporated; Title: PRACH design details; Document for: Discussion and Decision.
R1-163821; 3GPP TSG-RAN WG1#84bis; Busan, Korea, Apr. 11-15, 2016; Source: Ericsson; Title: On Performance of PRACH for Enhanced LAA; Agenda Item: 7.3.1.4; Document for: Discussion and Decision.
R2-162231; 3GPP TSG-RAN WG2 Meeting #93bis; Dubrovnik, Croatia, Apr. 11-15, 2016; RPA160001; Source: IAESI, Thales, Fairspectrum; Title: High level view of 5G access architecture; Document for: Discussion; Agenda Item: 9.3.1.
R2-162300; 3GPP TSG-RAN WG2 Meeting #93bis; Dubrovnik, Croatia, Apr. 11-15, 2016; Agenda item: 9.2; Source: Samsung; Title: Preliminary view on Initial Access in 5G; Document for: Discussion & Decision.
R2-162367; 3GPP TSG-RAN WG2 Meeting #93bis; Dubrovnik, Croatia, Apr. 11-15, 2016; Agenda item: 9.5.3; Source: Nokia, Alcatel-Lucent Shanghai Bell; Title: Efficient small data transmission; WID/SID: FS_NR_newRAT—Release 14; Document for: Discussion and Decision.

(56) References Cited

OTHER PUBLICATIONS

R2-162393; 3GPP TSG-RAN WG2 Meeting #93bis; Dubrovnik, Croatia, Apr. 11-15, 2016; Source: Samsung; Title: Random Access for eLAA; Agenda item: 8.1.1; Document for: Discussion and Agreement.

R2-162428; 3GPP TSG-RAN WG2 Meeting #93bis; Dubrovnik, Croatia Apr. 11-15, 2016; Agenda item: 8.1.1; Source: Huawei, HiSilicon; Title: Considerations on RACH for LAA SCell; Document for: Discussion and Decision.

R2-162471; 3GPP TSG RAN WG2 #93bis; Dubrovnik, Croatia, Apr. 11-15, 2016; Agenda item: 8.1.1; Source: Intel Corporation; Title: RACH procedure for UL LAA; Document for: Discussion and decision.

R2-162745; 3GPP TSG-RAN WG2 #93bis; Dubrovnik, Croatia, Apr. 11-15, 2016; Agenda Item: 8.1.1; Source: Ericsson; Title: Impact on Random Access due to LBT; Document for: Discussion, Decision.

R2-162763; 3GPP TSG-RAN WG2 #93bis; Dubrovnik, Croatia, Apr. 11-15, 2016; Agenda Item: 9.2; Source: Ericsson; Title: Initial considerations on NR system access; Document for: Discussion and Decision.

R2-162895; 3GPP TSG-RAN WG2 Meeting #93bis; Dubrovnik, Croatia, Apr. 11-15, 2016; Agenda Item: 8.1.1 (LTE_eLAA-Core); Source: LG Electronics Inc.; Title: Random access aspect in LAA; Document for: Discussion and Decision.

R2-162911; 3GPP TSG-RAN2 Meeting #93bis; Dubrovnik, Croatia, Apr. 12-16, 2016; Agenda item: 8.1.1; Source: Qualcomm Incorporated; Title: RACH Procedure for Enhanced LAA; Document for: Discussion and Decision.

RP-141188; 3GPP TSG RAN Meeting #65; Edinburgh, Scotland, Sep. 9-12, 2014; Source: ZTE; Title: Supporting dual connectivity in LTE-U; Agenda Item: 14.1.1; Document for: Discussion.

RP-151725; 3GPP TSG RAN Meeting #70; Sitges, Spain, Dec. 7-10, 2015; Source: ZTE, Xinwei; Title: Supporting dual connectivity in LAA; Agenda Item: 14.1.1; Document for: Discussion.

RP-151978; 3GPP TSG RAN Meeting #70; Sitges, Spain, Dec. 7-10, 2015; revision of RP-yynnnn; Source: Ericsson, Huawei; Title: New Work Item on enhanced LAA for LTE; Document for: Approval; Agenda Item: 14.1.1.

RP-151979; 3GPP TSG RAN Meeting #70; Sitges, Spain, Dec. 7-10, 2015; Agenda item 14.1.1; Motivation for Enhanced Licensed Assisted Access for LTE in Rel-14; Ericsson.

RP-160926; 3GPP TSG RAN Meeting #72; Busan, Korea, Jun. 13-17, 2016; Source: ZTE; Title: Discussion on further enhancement of LAA for LTE; Agenda Item: 10.2.1; Document for: Discussion.

RP-161036; 3GPP TSG RAN Meeting #72; Busan, Korea, Mar. 13-16, 2016; Title: Motivation for New Work Item for Enhancing Utilization of CA for LTE; Source: Nokia, Alcatel-Lucent Shanghai Bell; Document for: Discussion; Agenda Item: 10.1.2.

RP-161150; 3GPP TSG RAN Meeting #72; Busan, Korea, Jun. 13-16, 2016; Source: Qualcomm Incorporated; Title: New WI proposal on LTE standalone and dual connectivity operation in unlicensed spectrum; Document for: Approval; Agenda Item: 10.1.1.

RP-161701; 3GPP TSG RAN Meeting #73; New Orleans, Sep. 19-22, 2016; Source: ZTE; Title: New WI proposal Further enhancement on FeLAA; Document for: Approval; Agenda Item: 10.1.1.

RP-161702; 3GPP TSG RAN Meeting #73; New Orleans, USA, Sep. 19-22, 2016; Documents for: Discussion; Agenda item: 10.1.1; Motivation for new WI Further enhancement on FeLAA; ZTE Corporation.

* cited by examiner

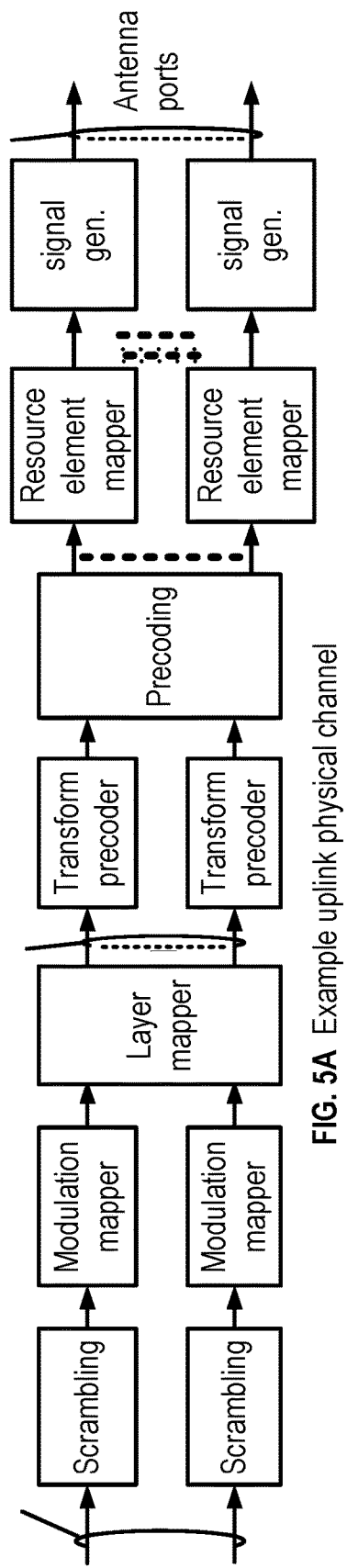
FIG. 5A Example uplink physical channel
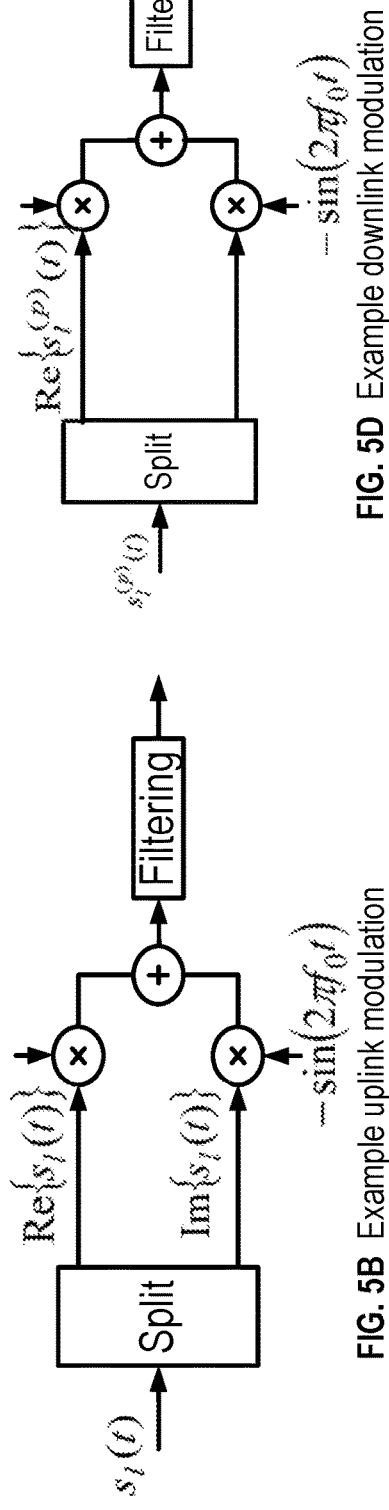
FIG. 5B Example uplink modulation
FIG. 5D Example downlink modulation
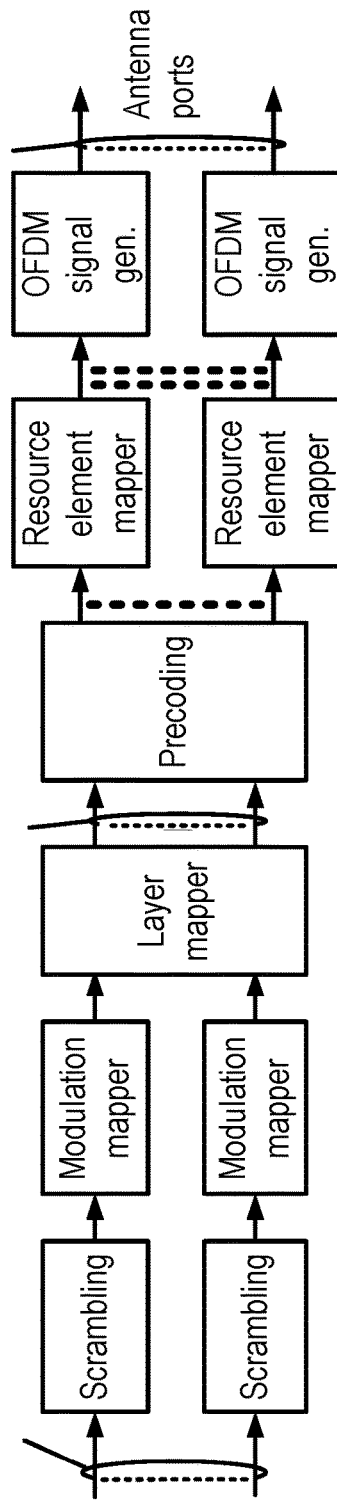
FIG. 5C Example downlink physical channel Dual-Connectivity at eNB Dual-Connectivity- two MAC entities at UE side

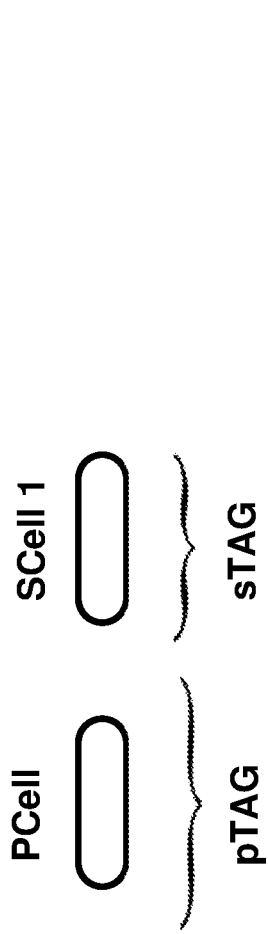
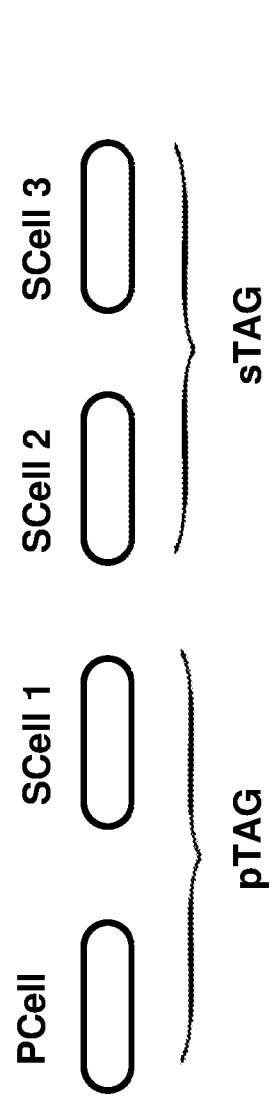
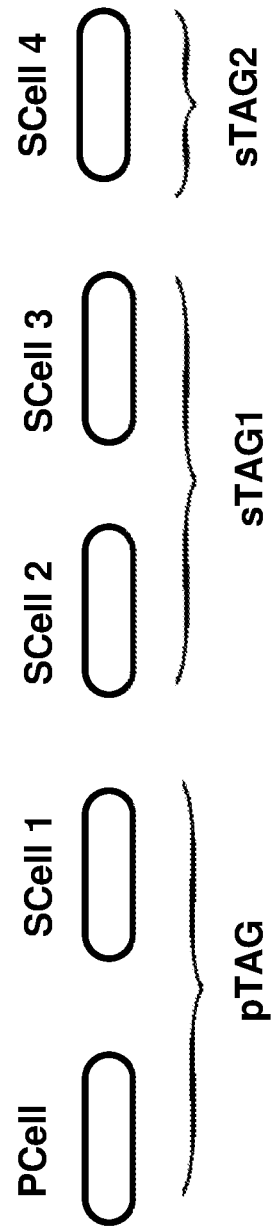
FIG. 8

RANDOM ACCESS IN A WIRELESS DEVICE AND WIRELESS NETWORK

CROSS-REFERENCE TO RELATED APPLICATIONS

This application claims the benefit of U.S. Provisional Application No. 62/435,548, filed Dec. 16, 2016 which is hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

FIG. 5A, FIG. 5B, FIG. 5C and FIG. 5D are example diagrams for uplink and downlink signal transmission as per an aspect of an embodiment of the present disclosure.

FIG. 8 shows example TAG configurations as per an aspect of an embodiment of the present disclosure.

DETAILED DESCRIPTION OF EMBODIMENTS

Figure 1:
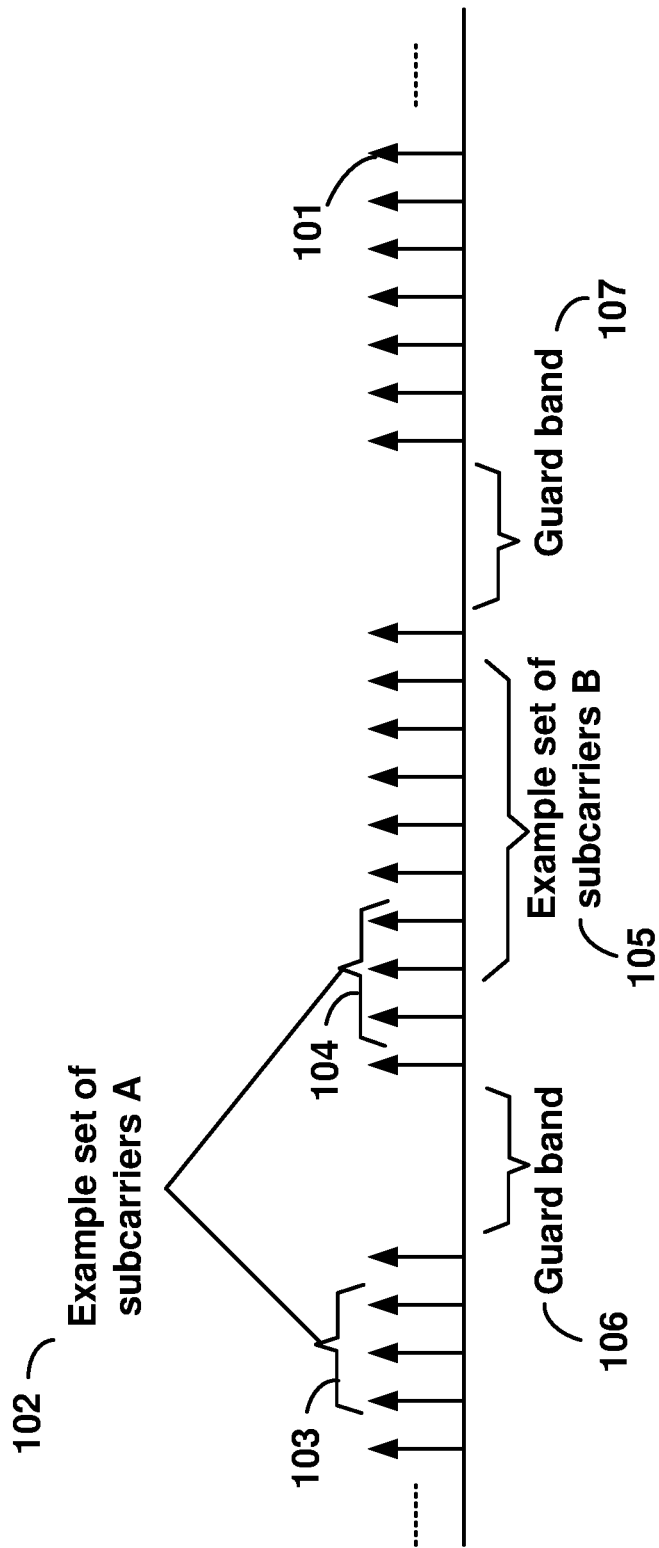
FIG. 1 is a diagram depicting example sets of OFDM subcarriers as per an aspect of an embodiment of the present disclosure.

Example embodiments of the present disclosure enable operation of carrier aggregation. Embodiments of the technology disclosed herein may be employed in the technical field of multicarrier communication systems.

The following Acronyms are used throughout the present disclosure:

ASIC application-specific integrated circuit
BPSK binary phase shift keying
CA carrier aggregation
CSI channel state information
CDMA code division multiple access
CSS common search space
CPLD complex programmable logic devices
CC component carrier
DL downlink
DCI downlink control information
DC dual connectivity
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LAA licensed assisted access
LTE long term evolution
MCG master cell group
MeNB master evolved node B
MIB master information block
MAC media access control
MAC media access control
MME mobility management entity
NAS non-access stratum
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying
RBG Resource Block Groups
RLC radio link control
RRC radio resource control RA random access
RB resource blocks
SCC secondary component carrier
SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TB transport block
UL uplink
UE user equipment
VHDL VHSIC hardware description language Example embodiments of the disclosure may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present disclosure. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
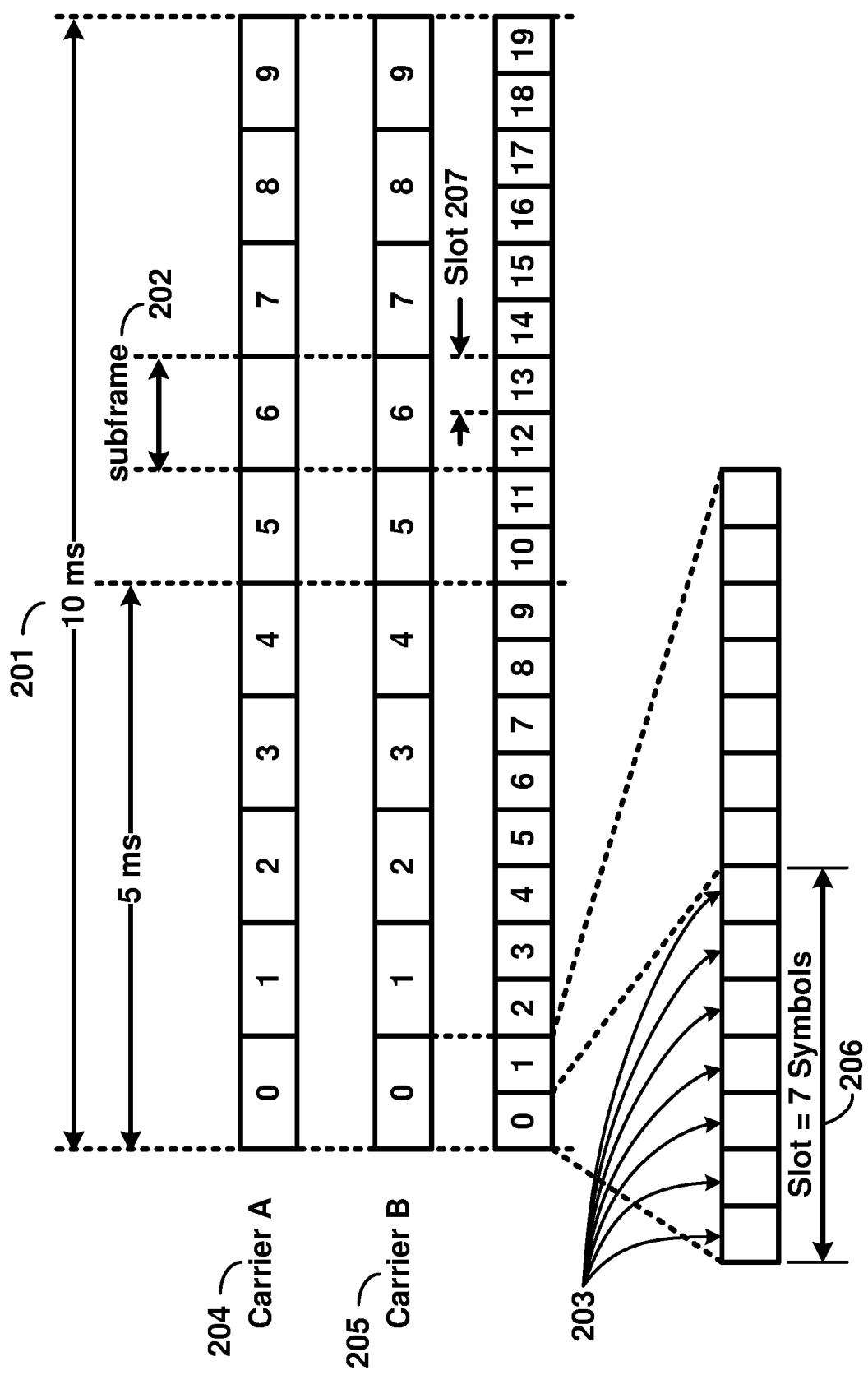
FIG. 2 is a diagram depicting an example transmission time and reception time for two carriers in a carrier group as per an aspect of an embodiment of the present disclosure.

FIG. 2 is a diagram depicting an example transmission time and reception time for two carriers as per an aspect of an embodiment of the present disclosure. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, the radio frame duration is 10 msec. Other frame durations, for example, in the range of 1 to 100 msec may also be supported. In this example, each 10 ms radio frame 201 may be divided into ten equally sized subframes 202. Other subframe durations such as 0.5 msec, 1 msec, 2 msec, and 5 msec may also be supported. Subframe(s) may consist of two or more slots (for example, slots 206 and 207). For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
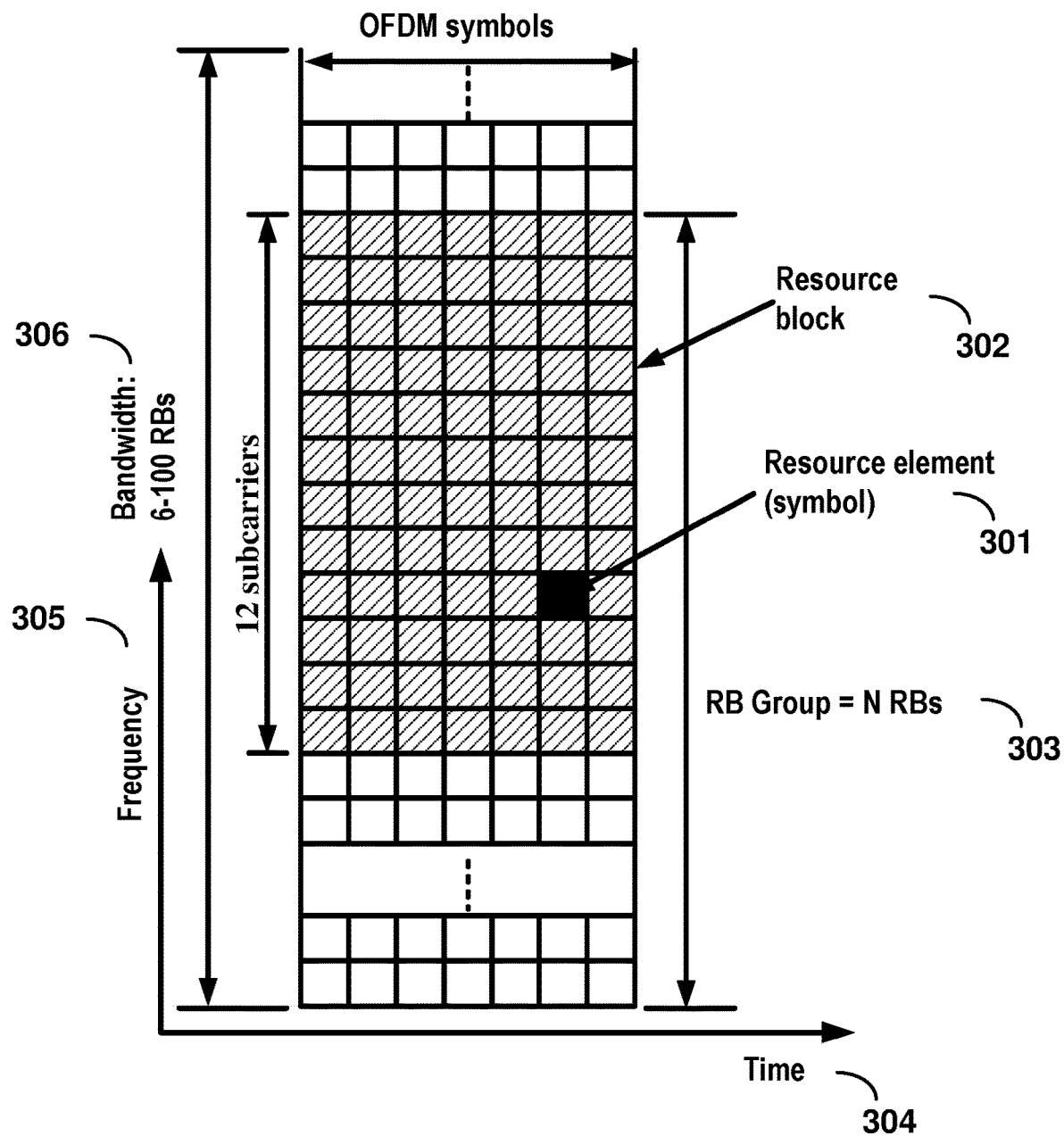
FIG. 3 is an example diagram depicting OFDM radio resources as per an aspect of an embodiment of the present disclosure.

FIG. 3 is a diagram depicting OFDM radio resources as per an aspect of an embodiment of the present disclosure. The resource grid structure in time 304 and frequency 305 is illustrated in FIG. 3. The quantity of downlink subcarriers or RBs (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

FIG. 5A, FIG. 5B, FIG. 5C and FIG. 5D are example diagrams for uplink and downlink signal transmission as per an aspect of an embodiment of the present disclosure. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
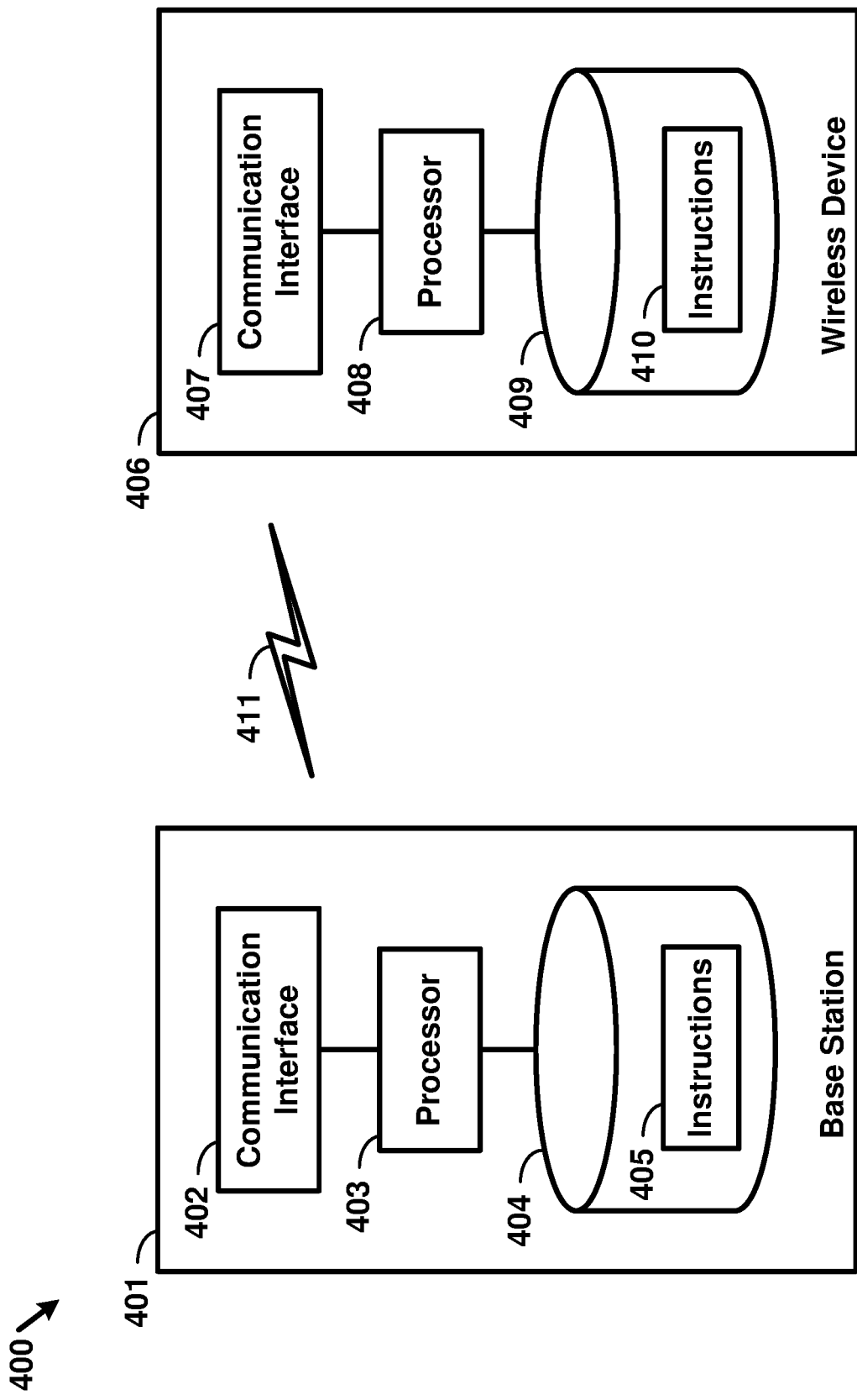
FIG. 4 is an example block diagram of a base station and a wireless device as per an aspect of an embodiment of the present disclosure.

FIG. 4 is an example block diagram of a base station 401 and a wireless device 406, as per an aspect of an embodiment of the present disclosure. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to aspects of an embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to various aspects of an embodiment, an LTE network may include a multitude of base stations, providing a user plane PDCP/RLC/MAC/PHY and control plane (RRC) protocol terminations towards the wireless device. The base station(s) may be interconnected with other base station(s) (for example, interconnected employing an X2 interface). Base stations may also be connected employing, for example, an S1 interface to an EPC. For example, base stations may be interconnected to the MME employing the S1-MME interface and to the S-G) employing the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, the carrier corresponding to the PCell may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply, for example, to carrier activation. When the specification indicates that a first carrier is activated, the specification may also mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

Figure 6:
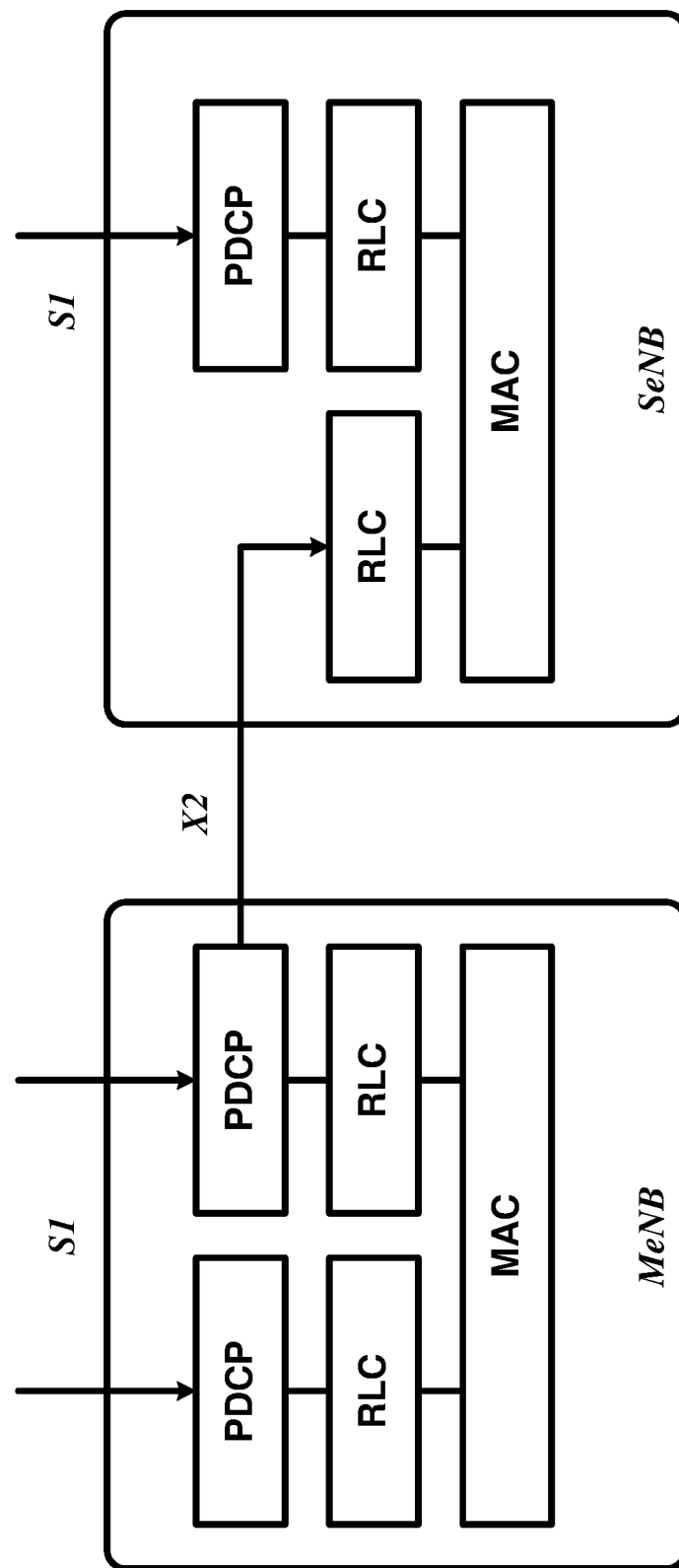
FIG. 6 is an example diagram for a protocol structure with CA and DC as per an aspect of an embodiment of the present disclosure.
Figure 7:
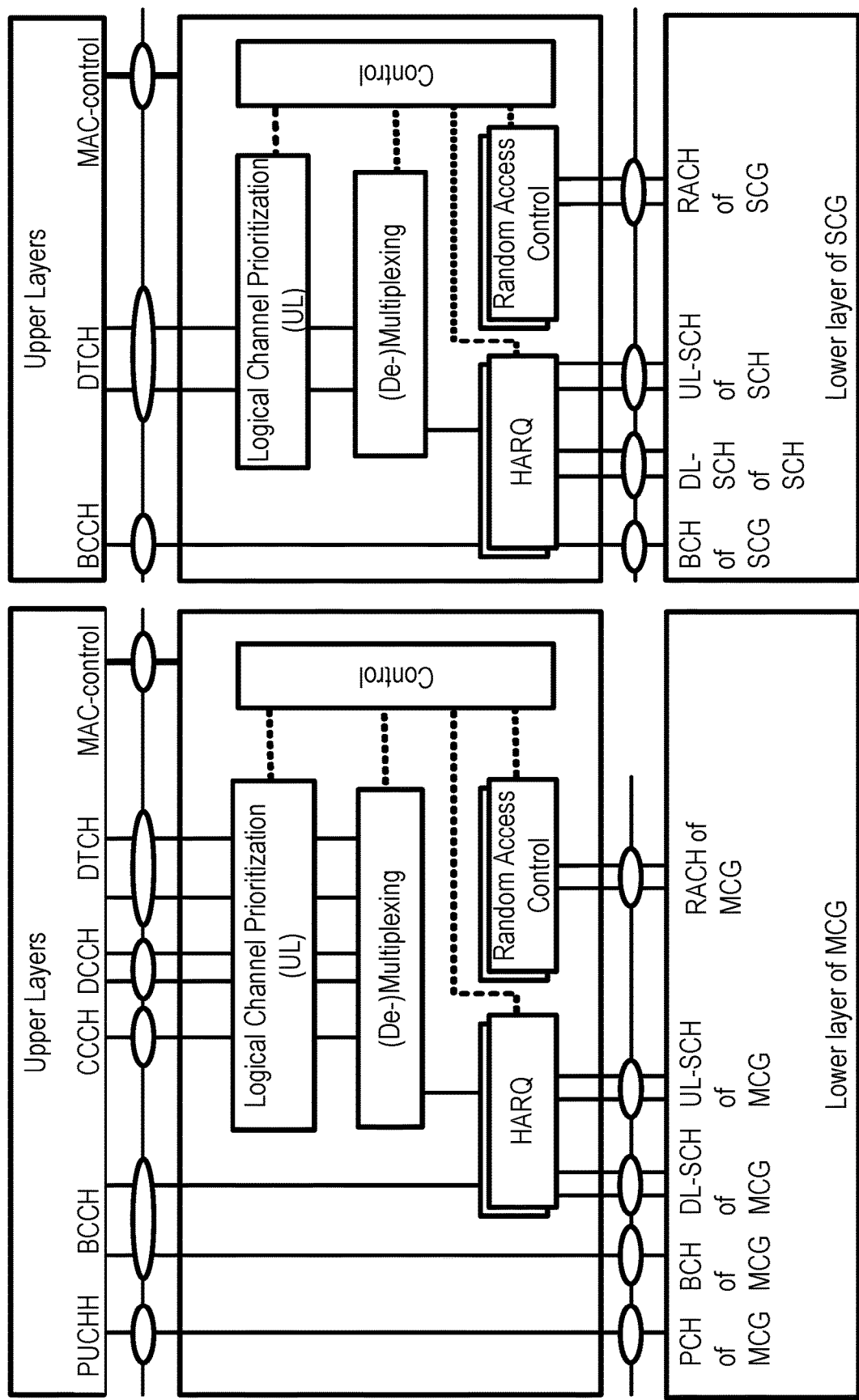
FIG. 7 is an example diagram for a protocol structure with CA and DC as per an aspect of an embodiment of the present disclosure.

FIG. 6 and FIG. 7 are example diagrams for protocol structure with CA and DC as per an aspect of an embodiment of the present disclosure. E-UTRAN may support Dual Connectivity (DC) operation whereby a multiple RX/TX UE in RRC_CONNECTED may be configured to utilize radio resources provided by two schedulers located in two eNBs connected via a non-ideal backhaul over the X2 interface. eNBs involved in DC for a certain UE may assume two different roles: an eNB may either act as an MeNB or as an SeNB. In DC a UE may be connected to one MeNB and one SeNB. Mechanisms implemented in DC may be extended to cover more than two eNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In DC, the radio protocol architecture that a particular bearer uses may depend on how the bearer is setup. Three alternatives may exist, an MCG bearer, an SCG bearer and a split bearer as shown in FIG. 6. RRC may be located in MeNB and SRBs may be configured as a MCG bearer type and may use the radio resources of the MeNB. DC may also be described as having at least one bearer configured to use radio resources provided by the SeNB. DC may or may not be configured/implemented in example embodiments of the disclosure.

In the case of DC, the UE may be configured with two MAC entities: one MAC entity for MeNB, and one MAC entity for SeNB. In DC, the configured set of serving cells for a UE may comprise two subsets: the Master Cell Group (MCG) containing the serving cells of the MeNB, and the Secondary Cell Group (SCG) containing the serving cells of the SeNB. For a SCG, one or more of the following may be applied. At least one cell in the SCG may have a configured UL CC and one of them, named PSCell (or PCell of SCG, or sometimes called PCell), may be configured with PUCCH resources. When the SCG is configured, there may be at least one SCG bearer or one Split bearer. Upon detection of a physical layer problem or a random access problem on a PSCell, or the maximum number of RLC retransmissions has been reached associated with the SCG, or upon detection of an access problem on a PSCell during a SCG addition or a SCG change: a RRC connection re-establishment procedure may not be triggered, UL transmissions towards cells of the SCG may be stopped, and a MeNB may be informed by the UE of a SCG failure type. For split bearer, the DL data transfer over the MeNB may be maintained. The RLC AM bearer may be configured for the split bearer. Like a PCell, a PSCell may not be de-activated. A PSCell may be changed with a SCG change (for example, with a security key change and a RACH procedure), and/or neither a direct bearer type change between a Split bearer and a SCG bearer nor simultaneous configuration of a SCG and a Split bearer may be supported.

With respect to the interaction between a MeNB and a SeNB, one or more of the following principles may be applied. The MeNB may maintain the RRM measurement configuration of the UE and may, (for example, based on received measurement reports or traffic conditions or bearer types), decide to ask a SeNB to provide additional resources (serving cells) for a UE. Upon receiving a request from the MeNB, a SeNB may create a container that may result in the configuration of additional serving cells for the UE (or decide that it has no resource available to do so). For UE capability coordination, the MeNB may provide (part of) the AS configuration and the UE capabilities to the SeNB. The MeNB and the SeNB may exchange information about a UE configuration by employing RRC containers (inter-node messages) carried in X2 messages. The SeNB may initiate a reconfiguration of its existing serving cells (for example, a PUCCH towards the SeNB). The SeNB may decide which cell is the PSCell within the SCG. The MeNB may not change the content of the RRC configuration provided by the SeNB. In the case of a SCG addition and a SCG SCell addition, the MeNB may provide the latest measurement results for the SCG cell(s). Both a MeNB and a SeNB may know the SFN and subframe offset of each other by OAM, (for example, for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present disclosure. In Example 1, pTAG comprises a PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
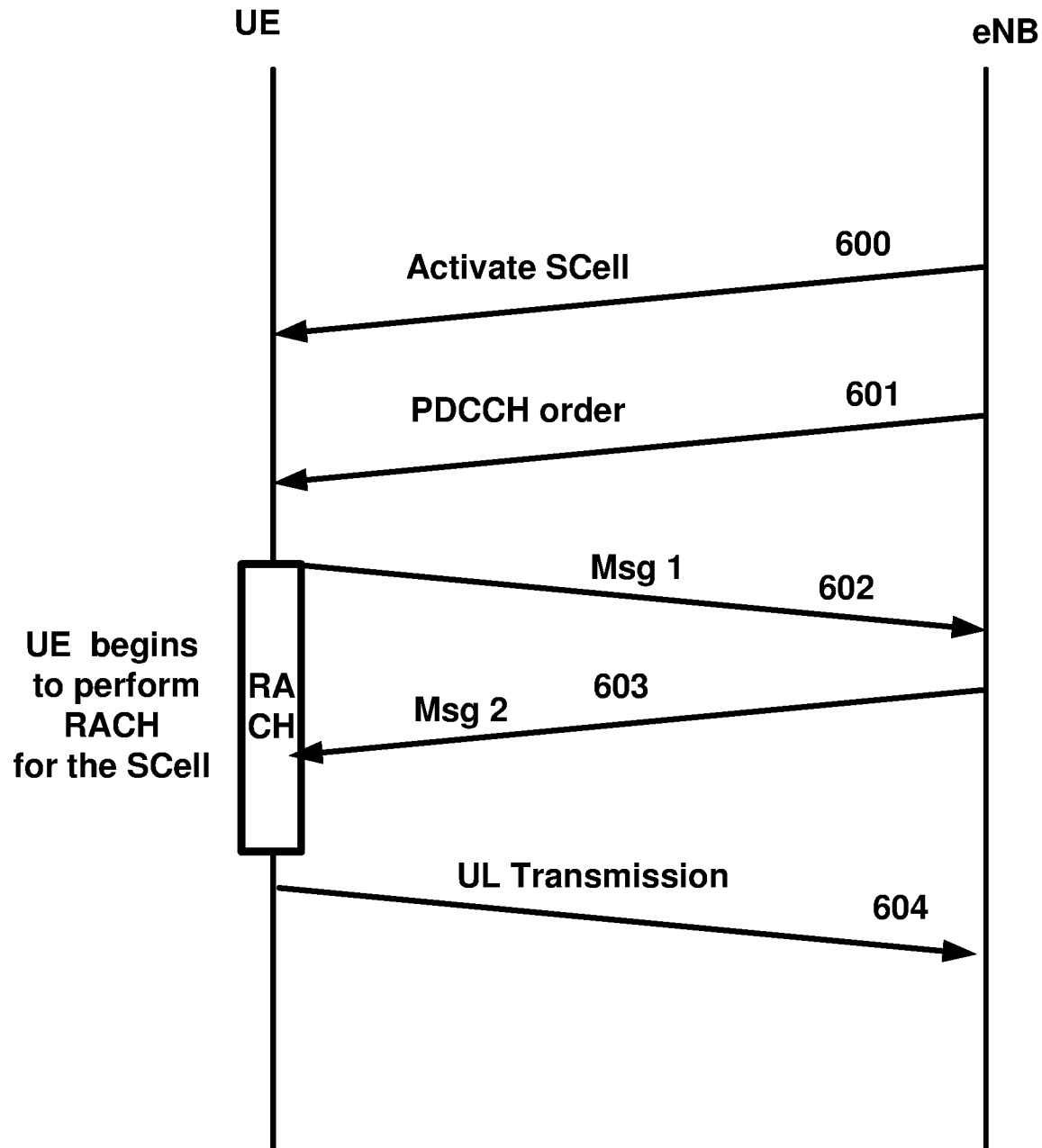
FIG. 9 is an example message flow in a random access process in a secondary TAG as per an aspect of an embodiment of the present disclosure.

FIG. 9 is an example message flow in a random access process in a secondary TAG as per an aspect of an embodiment of the present disclosure. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to an embodiment, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to various aspects of an embodiment, when an eNB performs an SCell addition configuration, the related TAG configuration may be configured for the SCell. In an example embodiment, an eNB may modify the TAG configuration of an SCell by removing (releasing) the SCell and adding(configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, (for example, at least one RRC reconfiguration message), may be send to the UE to reconfigure TAG configurations by releasing the SCell and then configuring the SCell as a part of the pTAG. When an SCell is added/configured without a TAG index, the SCell may be explicitly assigned to the pTAG. The PCell may not change its TA group and may be a member of the pTAG.

The purpose of an RRC connection reconfiguration procedure may be to modify an RRC connection, (for example, to establish, modify and/or release RBs, to perform handover, to setup, modify, and/or release measurements, to add, modify, and/or release SCells). If the received RRC Connection Reconfiguration message includes the sCell-ToReleaseList, the UE may perform an SCell release. If the received RRC Connection Reconfiguration message includes the sCellToAddModList, the UE may perform SCell additions or modification.

In LTE Release-10 and Release-11 CA, a PUCCH may only be transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the disclosure may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

The amount of data traffic carried over cellular networks is expected to increase for many years to come. The number of users/devices is increasing and each user/device accesses an increasing number and variety of services, e.g. video delivery, large files, images. This may require not only high capacity in the network, but also provisioning very high data rates to meet customers' expectations on interactivity and responsiveness. More spectrum may therefore be needed for cellular operators to meet the increasing demand. Considering user expectations of high data rates along with seamless mobility, it may be beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, may be an effective complement to licensed spectrum for cellular operators to help addressing the traffic explosion in some scenarios, such as hotspot areas. LAA may offer an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA may utilize at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs, time & frequency synchronization of UEs, and/or the like.

In an example embodiment, a DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

An LBT procedure may be employed for fair and friendly coexistence of LAA with other operators and technologies operating in an unlicensed spectrum. LBT procedures on a node attempting to transmit on a carrier in an unlicensed spectrum may require the node to perform a clear channel assessment to determine if the channel is free for use. An LBT procedure may involve at least energy detection to determine if the channel is being used. For example, regulatory requirements in some regions, for example, in Europe, may specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold. For example, LAA may employ a mechanism to adaptively lower the energy detection threshold from an upper bound. Adaptation mechanism(s) may not preclude static or semi-static setting of the threshold. In an example a Category 4 LBT mechanism or other type of LBT mechanisms may be implemented.

Various example LBT mechanisms may be implemented. In an example, for some signals, in some implementation scenarios, in some situations, and/or in some frequencies, no LBT procedure may performed by the transmitting entity. In an example, Category 2 (for example, LBT without random back-off) may be implemented. The duration of time that the channel is sensed to be idle before the transmitting entity transmits may be deterministic. In an example, Category 3 (for example, LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (for example, LBT with random back-off with a contention window of variable size) may be implemented. The transmitting entity may draw a random number N within a contention window. The size of the contention window may be specified by a minimum and maximum value of N. The transmitting entity may vary the size of the contention window when drawing the random number N. The random number N may be employed in the LBT procedure to determine the duration of time that the channel is sensed to be idle before the transmitting entity transmits on the channel.

LAA may employ uplink LBT at the UE. The UL LBT scheme may be different from the DL LBT scheme (for example, by using different LBT mechanisms or parameters), since the LAA UL may be based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. A UL transmission burst from a UE perspective may be a continuous transmission from a UE with no transmission immediately before or after from the same UE on the same CC. In an example, a UL transmission burst may be defined from a UE perspective. In an example, a UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

Figure 10:
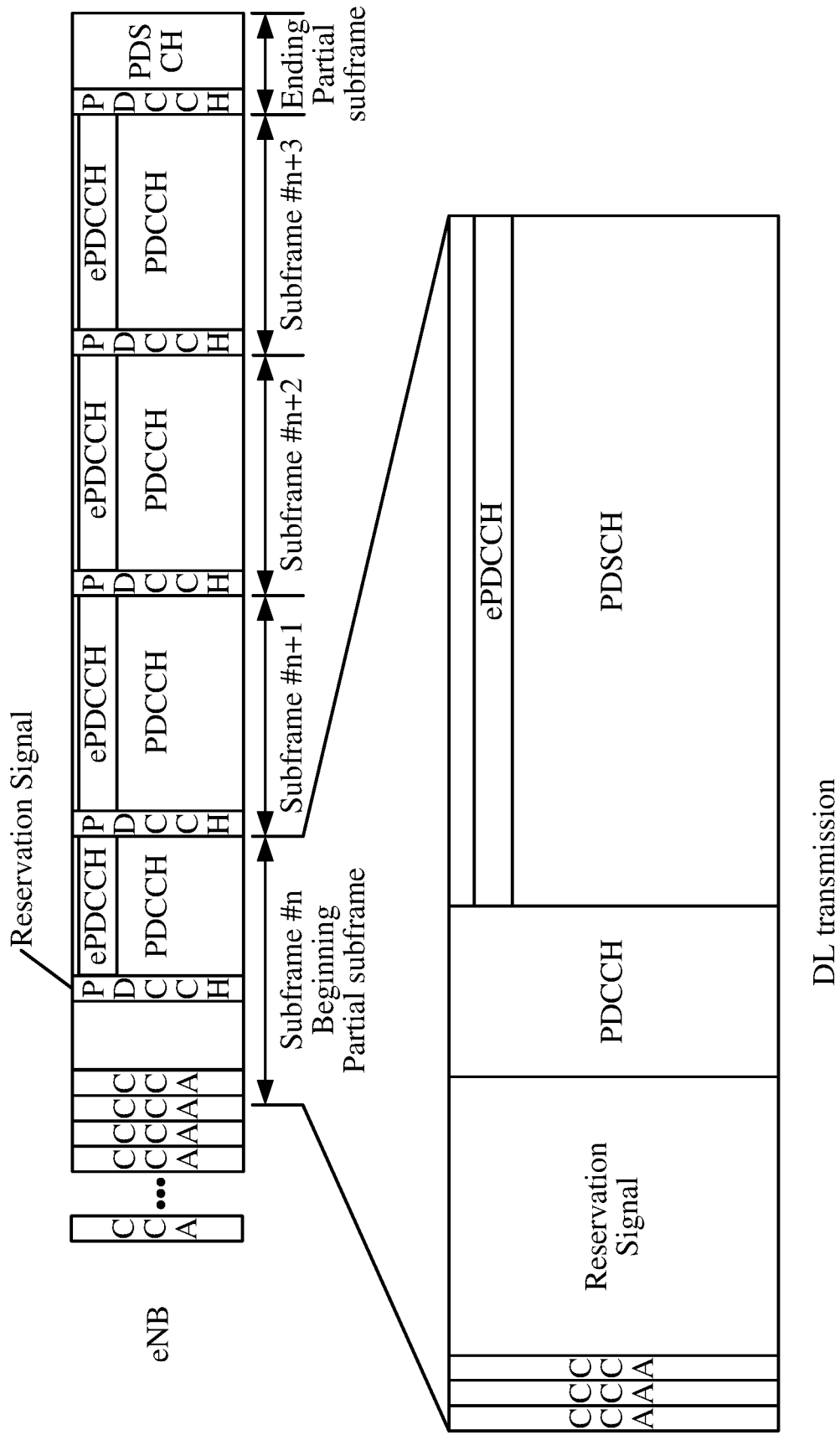
FIG. 10 is an example diagram depicting a downlink burst as per an aspect of an embodiment of the present disclosure.

In an example embodiment, in an unlicensed cell, a downlink burst may be started in a subframe. When an eNB accesses the channel, the eNB may transmit for a duration of one or more subframes. The duration may depend on a maximum configured burst duration in an eNB, the data available for transmission, and/or eNB scheduling algorithm. FIG. 10 shows an example downlink burst in an unlicensed (e.g. licensed assisted access) cell. The maximum configured burst duration in the example embodiment may be configured in the eNB. An eNB may transmit the maximum configured burst duration to a UE employing an RRC configuration message.

The wireless device may receive from a base station at least one message (for example, an RRC) comprising configuration parameters of a plurality of cells. The plurality of cells may comprise at least one cell of a first type (e.g. license cell) and at least one cell of a second type (e.g. unlicensed cell, an LAA cell). The configuration parameters of a cell may, for example, comprise configuration parameters for physical channels, (for example, a ePDCCH, PDSCH, PUSCH, PUCCH and/or the like). The wireless device may determine transmission powers for one or more uplink channels. The wireless device may transmit uplink signals via at least one uplink channel based on the determined transmission powers.

In an example embodiment, LTE transmission time may include frames, and a frame may include many subframes. The size of various time domain fields in the time domain may be expressed as a number of time units $T_s=1/(15000 \times 2048)$ seconds. Downlink, uplink and sidelink transmissions may be organized into radio frames with $T_f=307200 \times T_s=10$ ms duration.

In an example LTE implementation, at least three radio frame structures may be supported: Type 1, applicable to FDD, Type 2, applicable to TDD, Type 3, applicable to LAA secondary cell operation. LAA secondary cell operation applies to frame structure type 3.

Transmissions in multiple cells may be aggregated where one or more secondary cells may be used in addition to the primary cell. In case of multi-cell aggregation, different frame structures may be used in the different serving cells.

Frame structure type 1 may be applicable to both full duplex and half duplex FDD. A radio frame is $T_f=307200 \cdot T_s=10$ ms long and may comprise 20 slots of length $T_{slot}=15360 \cdot T_s=0.5$ ms, numbered from 0 to 19. A subframe may include two consecutive slots where subframe i comprises of slots 2i and 2i+1.

For FDD, 10 subframes are available for downlink transmission and 10 subframes are available for uplink transmissions in a 10 ms interval. Uplink and downlink transmissions are separated in the frequency domain. In half-duplex FDD operation, the UE may not transmit and receive at the same time while there may not be such restrictions in full-duplex FDD.

Frame structure type 2 may be applicable to TDD. A radio frame of length $T_f=307200 \cdot T_s=10$ ms may comprise of two half-frames of length $153600 \cdot T_s=5$ ms. A half-frame may comprise five subframes of length $30720 \cdot T_s=1$ ms. A subframe i may comprise two slots, 2i and 2i+1, of length $T_{slot}=15360 \cdot T_s=0.5$ ms.

The uplink-downlink configuration in a cell may vary between frames and controls in which subframes uplink or downlink transmissions may take place in the current frame. The uplink-downlink configuration in the current frame is obtained via control signaling.

An example subframe in a radio frame, "may be a downlink subframe reserved for downlink transmissions, may be an uplink subframe reserved for uplink transmissions or may be a special subframe with the three fields DwPTS, GP and UpPTS. The length of DwPTS and UpPTS are subject to the total length of DwPTS, GP and UpPTS being equal to $30720 \cdot T_s=1$ ms.

Uplink-downlink configurations with both 5 ms and 10 ms downlink-to-uplink switch-point periodicity may be supported. In case of 5 ms downlink-to-uplink switch-point periodicity, the special subframe may exist in both half-frames. In case of 10 ms downlink-to-uplink switch-point periodicity, the special subframe may exist in the first half-frame.

Subframes 0 and 5 and DwPTS may be reserved for downlink transmission. UpPTS and the subframe immediately following the special subframe may be reserved for uplink transmission.

In an example, in case multiple cells are aggregated, the UE may assume that the guard period of the special subframe in the cells using frame structure Type 2 have an overlap of at least $1456 \cdot T_s$.

In an example, in case multiple cells with different uplink-downlink configurations in the current radio frame are aggregated and the UE is not capable of simultaneous reception and transmission in the aggregated cells, the following constraints may apply. if the subframe in the primary cell is a downlink subframe, the UE may not transmit any signal or channel on a secondary cell in the same subframe. If the subframe in the primary cell is an uplink subframe, the UE may not be expected to receive any downlink transmissions on a secondary cell in the same subframe. If the subframe in the primary cell is a special subframe and the same subframe in a secondary cell is a downlink subframe, the UE may not be expected to receive PDSCH/EPDCCH/PMCH/PRS transmissions in the secondary cell in the same subframe, and the UE may not be expected to receive any other signals on the secondary cell in OFDM symbols that overlaps with the guard period or UpPTS in the primary cell.

Frame structure type 3 may be applicable to LAA secondary cell operation with normal cyclic prefix. A radio frame is $T_f=307200 \cdot T_s$: 0.10 ms long and comprises of 20 slots of length $T_{slot}=15360 \cdot T_s$: =0.5 ms, numbered from 0 to 19. A subframe may comprise as two consecutive slots where subframe i comprises slots 2i and 2i+1.

The 10 subframes within a radio frame are available for downlink transmissions. Downlink transmissions occupy one or more consecutive subframes, starting anywhere within a subframe and ending with the last subframe either fully occupied or following one of the DwPTS durations. Subframes may be available for uplink transmission when LAA uplink is supported.

Some example embodiments may be implemented in stand-alone unlicensed operation when a UE communications with an eNB via a plurality of unlicensed cells. Some example embodiments may be implemented in dual-connectivity configuration when a UE is connected to two eNBs via a plurality of licensed and/or unlicensed cells.

In an example, when configured with dual connectivity (DC), a UE may be simultaneously connected to two eNBs: e.g., a master eNB (MeNB) and a secondary eNB (SeNB). The MeNB and SeNB may be connected via an X2 interface.

In an example, E-UTRAN may support Dual Connectivity (DC) operation. A UE in RRC_CONNECTED equipped with multiple Rx/Tx may be configured to utilize radio resources provided by two distinct schedulers, located in two eNBs connected via a non-ideal backhaul over the X2 interface. The overall E-UTRAN architecture may be applicable for DC as well. eNBs involved in DC for a certain UE may assume two different roles: an eNB may either act as an MeNB or as an SeNB. In DC a UE may be connected to one MeNB and one SeNB.

Figure 11:
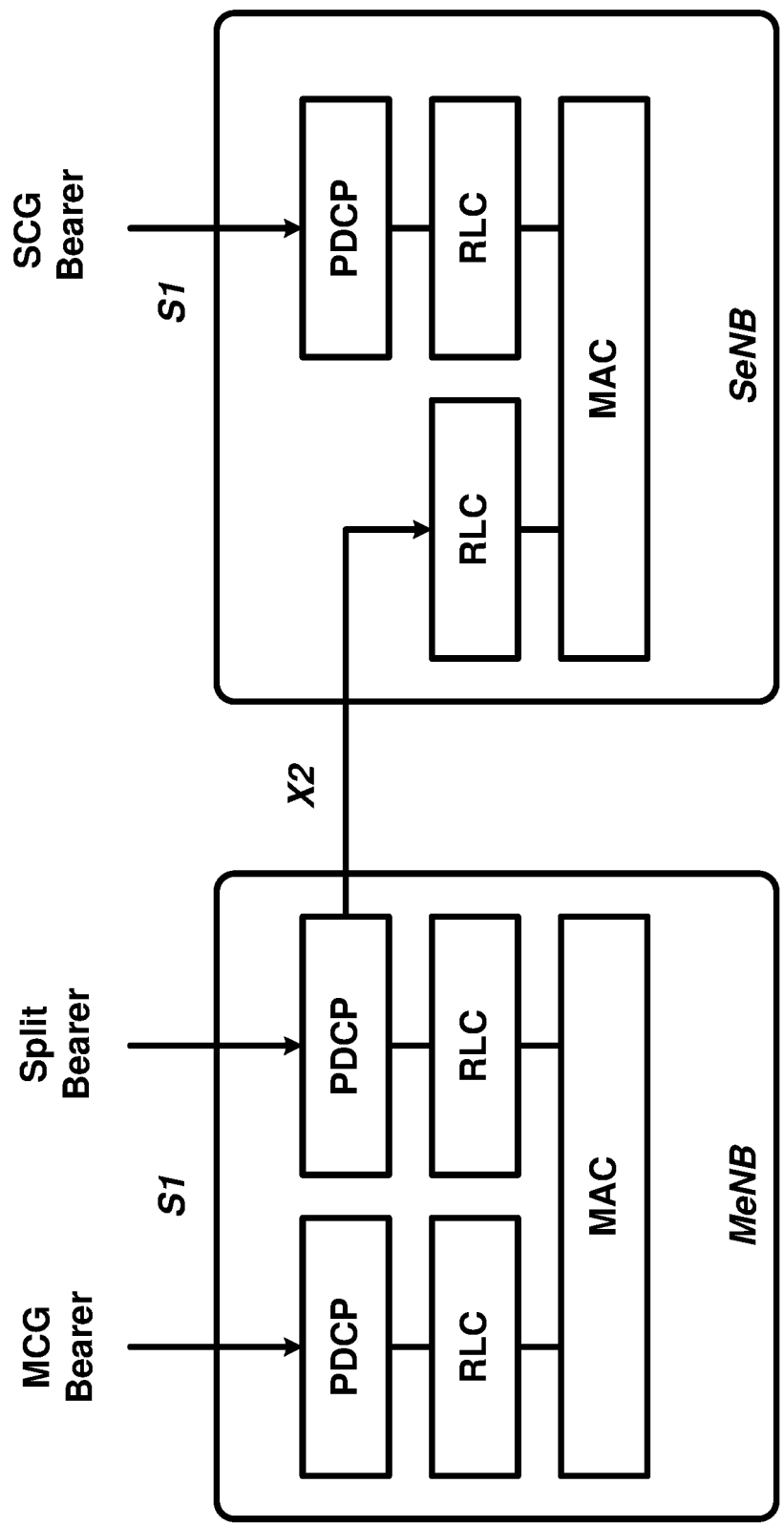
FIG. 11 is an example dual connectivity architecture with different bearer types as per an aspect of an embodiment of the present disclosure.

In an example, in DC, the radio protocol architecture that a particular bearer uses may depend on how the bearer is setup. In an example, three bearer types may exist: MCG bearer, SCG bearer and split bearer. Example bearer types are shown in FIG. 11. In an example, RRC may be located in MeNB and SRBs may be configured as MCG bearer type. In an example, SRBs may use the radio resources of the MeNB. In an example, at least one bearer may be configured to use radio resources provided by the SeNB.

In an example, inter-eNB control plane signalling for DC may be performed by means of X2 interface signalling. Control plane signalling towards the MME may be performed by means of S1 interface signalling. In an example, there may be one S1-MME connection per DC UE between the MeNB and the MME. An eNB may handle UEs independently, e.g., provide the PCell to some UEs while providing SCell(s) for SCG to others. An eNB involved in DC for a certain UE may control its radio resources and may be primarily responsible for allocating radio resources of its cells. Respective coordination between MeNB and SeNB may be performed by means of X2 interface signalling.

In an example, for dual connectivity two different user plane architectures may be allowed. In an example first architecture, the S1-U may terminate in the MeNB and the user plane data may be transferred from MeNB to SeNB, e.g., using the X2-U. In an example, second architecture, the S1-U may terminate in the SeNB.

In an example, different bearer options may be configured with different user plane architectures. U-plane connectivity may depend on the bearer option configured. In an example, for MCG bearers, the S1-U connection for the corresponding bearer(s) to the S-GW may be terminated in the MeNB. The SeNB may not be involved in the transport of user plane data for this type of bearer(s) over the Uu. In an example, for split bearers, the S1-U connection to the S-GW may be terminated in the MeNB. PDCP data may be transferred between the MeNB and the SeNB via X2-U. The SeNB and MeNB may be involved in transmitting data of this bearer type over the Uu. In an example, for SCG bearers, the SeNB may be directly connected with the S-GW via S1-U. The MeNB may not be involved in the transport of user plane data for this type of bearer(s) over the Uu. In an example, if only MCG and split bearers are configured, there may be no S1-U termination in the SeNB.

In an example in DC, the random access procedure may be performed on at least PSCell upon SCG addition/modification, for example, if instructed, or upon DL/UL data arrival during RRC_CONNECTED requiring random access procedure. In an example, the UE initiated random access procedure may be performed only on PSCell for SCG.

Figure 12:
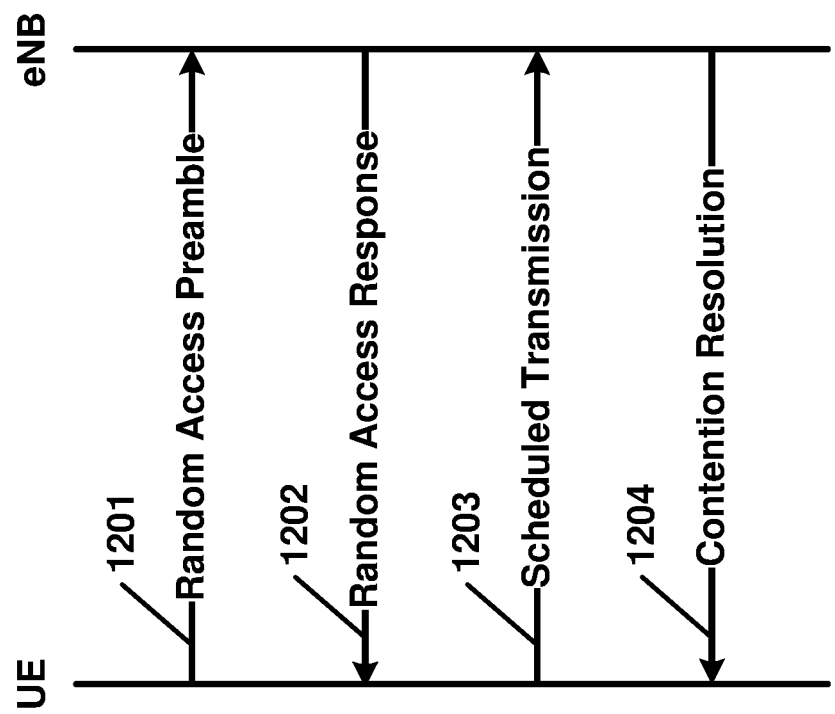
FIG. 12 is an example random access procedure as per aspect of an embodiment of the present disclosure.

In an example, the random access procedure may be contention based or non-contention based. Example contention based random access procedure is shown in FIG. 12. Example four actions of the contention based random access procedures may be: (1201) Random Access Preamble on RACH in uplink; (1202) Random Access Response generated by MAC on DL-SCH; (1203) first scheduled UL transmission on UL-SCH; and (1204) Contention resolution.

In an example, there may be two possible groups defined and one may be optional. If both groups are configured the size of message 3 and the pathloss may be used to determine which group a preamble is selected from. The group to which a preamble belongs provides an indication of the size of the message 3 and the radio conditions at the UE. The preamble group information along with the necessary thresholds may be broadcast on system information. Example embodiments enhance the preamble transmission and/or reception for a LAA cell and/or when PSCell is an LAA cell.

In an example, the Random Access Response may be Semi-synchronous (within a flexible window of which the size is one or more TTI) with message 1. In an example, there may be no HARQ process for the Random Access Response. The Random Access Response may be addressed to RA-RNTI on PDCCH. In an example, the Random Access Response may convey RA-preamble identifier, Timing Alignment information for the pTAG, and initial UL grant and assignment of Temporary C-RNTI (which may or may not be made permanent upon Contention Resolution). In an example, the Random Access Response may be intended for a variable number of UEs in one DL-SCH message. Example embodiments enhance the random access response transmission and/or reception for a LAA cell and/or when PSCell is an LAA cell.

In an example the first scheduled UL transmission on UL-SCH may use a HARQ process. In an example, a size of transport block of the first scheduled uplink transmission may depend on the UL grant conveyed in action 1202. In an example, for initial access, the first scheduled UL transmission on UL-SCH may convey the RRC Connection Request generated by the RRC layer and transmitted via CCCH; may at least NAS UE identifier but no NAS message; may use RLC TM: no segmentation.

In an example, for the RRC connection Re-establishment procedure, the first scheduled UL transmission on UL-SCH may convey the RRC Connection Re-establishment Request generated by the RRC layer and transmitted via CCCH; may use RLC TM: no segmentation and may not contain a NAD message.

In an example, the first scheduled UL transmission on UL-SCH, after handover, in the target cell, may convey the ciphered and integrity protected RRC Handover Confirm generated by the RRC layer and transmitted via DCCH; may convey the C-RNTI of the UE (which was allocated via the Handover Command); and may include an uplink Buffer Status Report when possible.

In an example, the first scheduled UL transmission on UL-SCH, may convey at least the C-RNTI of the UE for other events. Example embodiments may enhance the Msg3 transmission and/or reception for a LAA cell and/or when PSCell is an LAA cell.

In an example, contention resolution on DL: early contention resolution may be used e.g., eNB may not wait for NAS reply before resolving contention; may not be synchronised with message 3; may support HARQ; and may be addressed to the Temporary C-RNTI on PDCCH for initial access and after radio link failure, and the C-RNTI on PDCCH for UE in RRC_CONNECTED. In an example, HARQ feedback may be transmitted only by the UE which detects its own UE identity, as provided in message 3, echoed in the Contention Resolution message. In an example, for initial access and RRC Connection Re-establishment procedure, no segmentation may be used (RLC-TM). Example embodiments may enhance the Msg4 transmission and/or reception for a LAA cell and/or when PSCell is an LAA cell.

In an example, the Temporary C-RNTI may be promoted to C-RNTI for a UE which detects RA success and does not already have a C-RNTI; it may be dropped by others. A UE which detects RA success and already has a C-RNTI, may resume using its C-RNTI. In an example, when CA is configured, the first three actions of the contention based random access procedures may occur on the PCell while contention resolution (action 1204) may be cross-scheduled by the PCell. In an example, when DC is configured, the first three actions of the contention based random access procedures may occur on the PCell in MCG and PSCell in SCG. When CA is configured in SCG, the first three actions of the contention based random access procedures may occur on the PSCell while contention resolution (action 1204) may be cross-scheduled by the PSCell. Example embodiments may enhance the preamble/RAR/Msg3/Msg4 transmission and/or reception for a LAA cell and/or when PSCell is an LAA cell. In an example, cells other than the PSCell may be used for preamble/RAR/Msg3 transmission/reception and/or other mechanisms may be used when a PSCell is a LAA cell.

Figure 13:
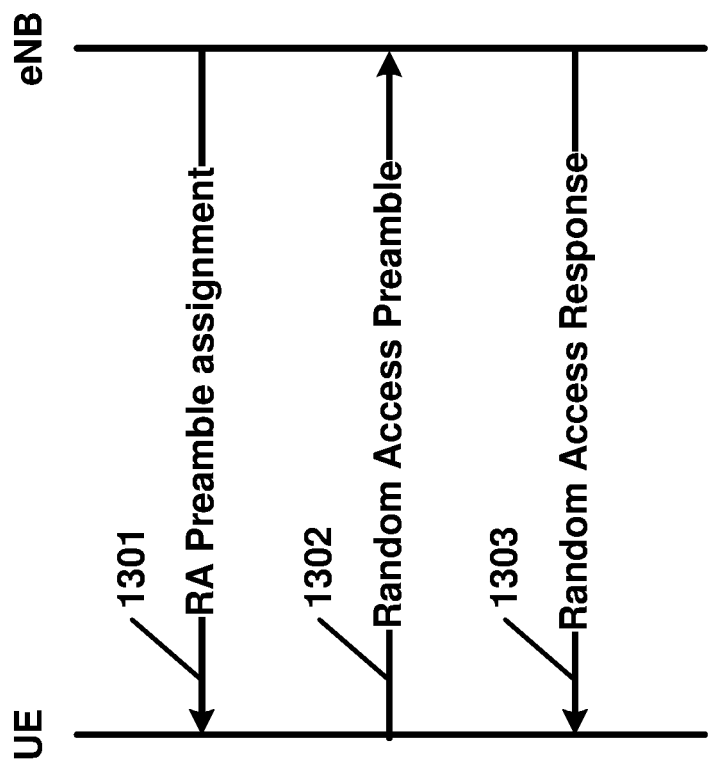
FIG. 13 is an example random access procedure as per aspect of an embodiment of the present disclosure.

Example non-contention based random access procedure is shown in FIG. 13. Example three actions of the non-contention based random access procedures may be (1) Random Access Preamble assignment via dedicated signalling in DL; (2) Random Access Preamble on RACH in uplink; and (3) Random Access Response on DL-SCH.

In an example, when performing non-contention based random access on the PCell while CA is configured, the Random Access Preamble assignment via PDCCH of action 1301, action 1302, and action 1303 of the non-contention based random access procedure may occur on the PCell. In order to establish timing advance for a sTAG, the eNB may initiate a non-contention based random access procedure with a PDCCH order (e.g., action 1301) that may be sent on a scheduling cell of activated SCell of the sTAG. Preamble transmission (e.g., action 1302) may be on the indicated SCell and Random Access Response (e.g., action 1303) may take place on PCell.

In an example, when performing non-contention based random access on the PCell or PSCell while DC is configured, the Random Access Preamble assignment via PDCCH of action 1301, action 1302, and action 1303 of the non-contention based random access procedure may occur on the corresponding cell. In order to establish timing advance for a sTAG, the eNB may initiate a non-contention based random access procedure with a PDCCH order (e.g., action 1301) that is sent on a scheduling cell of activated SCell of the sTAG not including PSCell. Preamble transmission (e.g., action 1302) may be on the indicated SCell and Random Access Response (e.g., action 1303) may take place on PCell for MCG and PSCell for SCG.

In an example, the Random Access procedure may be initiated by a PDCCH order, by the MAC sublayer itself or by the RRC sublayer. Random Access procedure on an SCell may be initiated by a PDCCH order. If a MAC entity receives a PDCCH transmission consistent with a PDCCH order masked with its C-RNTI, and for a specific Serving Cell, the MAC entity may initiate a Random Access procedure on the Serving Cell. For Random Access on the SpCell a PDCCH order or RRC may optionally indicate the ra-PreambleIndex and the ra-PRACH-MaskIndex, except for NB-IoT where the subcarrier index is indicated; and for Random Access on an SCell, the PDCCH order may indicate the ra-PreambleIndex with a value different from 000000 and the ra-PRACH-MaskIndex. For the pTAG preamble transmission on PRACH and reception of a PDCCH order may be supported for SpCell.

In an example, before the procedure can be initiated, the following information for related Serving Cell is assumed to be available for a UE: (1) the available set of PRACH resources for the transmission of the Random Access Preamble, prach-ConfigIndex; (2) the groups of Random Access Preambles and the set of available Random Access Preambles in each group (e.g., SpCell); if Random Access Preambles group B exists, the thresholds, messagePowerOffsetGroupB and messageSizeGroupA, the configured UE transmitted power of the Serving Cell performing the Random Access Procedure, PCMAX, c, and the offset between the preamble and Msg3, deltaPreambleMsg3, that are required for selecting one of the two groups of Random Access Preambles (e.g., SpCell); the RA response window size ra-ResponseWindowSize; the power-ramping factor powerRampingStep; the maximum number of preamble transmission preambleTransMax; the initial preamble power preambleInitialReceivedTargetPower; the preamble format based offset DELTA_PREAMBLE; the maximum number of Msg3 HARQ transmissions maxHARQ-Msg3Tx (SpCell only); the Contention Resolution Timer mac-ContentionResolutionTimer (SpCell only). In an example, the above parameters may be updated from upper layers before each Random Access procedure is initiated.

In an example, the Random Access procedure may be performed as follows: (1) Flush the Msg3 buffer; (2) set the PREAMBLE_TRANSMISSION_COUNTER to 1; (3) set the PREAMBLE_TRANSMISSION_ATTEMPT_COUNTER to 1; set the backoff parameter value to 0 ms; proceed to the selection of the Random Access Resource. In an example, the UE may set PREAMBLE_RECEIVED_TARGET_POWER to preambleInitialReceivedTargetPower+DELTA_PREAMBLE+(PREAMBLE_TRANSMISSION_COUNTER−1)*powerRampingStep.

In an example the IE PRACH-ConfigSIB and IE PRACH-Config may be used to specify the PRACH configuration in the system information and in the mobility control information, respectively. The base station may transmit the PRACH configuration parameters to specify the random access configuration parameters for the wireless device.

In an example, the prach-ConfigIndex IE may indicate the PRACH configuration index for a wireless device to determine the PRACH resources. In an example, the transmission of a random access preamble, if triggered by the MAC layer, may be restricted to certain time and frequency resources. These resources may be enumerated in increasing order of the subframe number within the radio frame and the physical resource blocks in the frequency domain such that index 0 may correspond to the lowest numbered physical resource block and subframe within the radio frame. PRACH resources within the radio frame may be indicated by a PRACH configuration index. In an example, for frame structure type 1 (e.g., FDD), a PRACH configuration index may determine a preamble format, whether PRACH resources are available in any frame or frames with even system frame numbers, and subframes of a frame where the PRACH resources are located. In an example PRACH configuration parameters may indicate a frequency offset (e.g., the prach-FrequencyOffset IE) that determines the first physical resource block allocated to the PRACH resource. In an example, for frame structure type 2, the PRACH configuration index may indicate a preamble format, a density per 10 ms parameter (e.g., $D_{RA}$) and a Version parameter (e.g., $r_{RA}$). The parameters PRACH configuration parameters may indicate the RACH resources for transmission of the preamble.

In a dual connectivity architecture, a wireless device may communicate with a secondary base station employing a SCG comprising one or more LAA cells. The wireless device may initiate a random access procedure (e.g., contention based or non-contention based) and may attempt to transmit a random access preamble via an LAA cell in the one or more LAA cells of the SCG. Both wireless device and the base station may transmit on the LAA cell in response to a listen before talk (LBT) procedure indicating that the channel is not occupied. The transmission of preamble and/or Msg3 (e.g., for contention-based RACH) by the wireless device and the transmission of the random access response (RAR) and the Msg4 (e.g., for contention-based RACH) by the base station are subject to LBT procedure at the wireless device or the base station indicating clear channel. The need for performing LBT degrades the performance by causing delay and/or failure in random access procedure which leads to delay in initial access and/or uplink synchronization issues and/or scheduling and/or handover problem and/or other performance degradations. The random access procedure for dual connectivity with LAA needs to be enhanced. Example embodiments enhance the random access procedure to improve the wireless device performance when the wireless device initiates the random access with a secondary base station.

Figure 14:
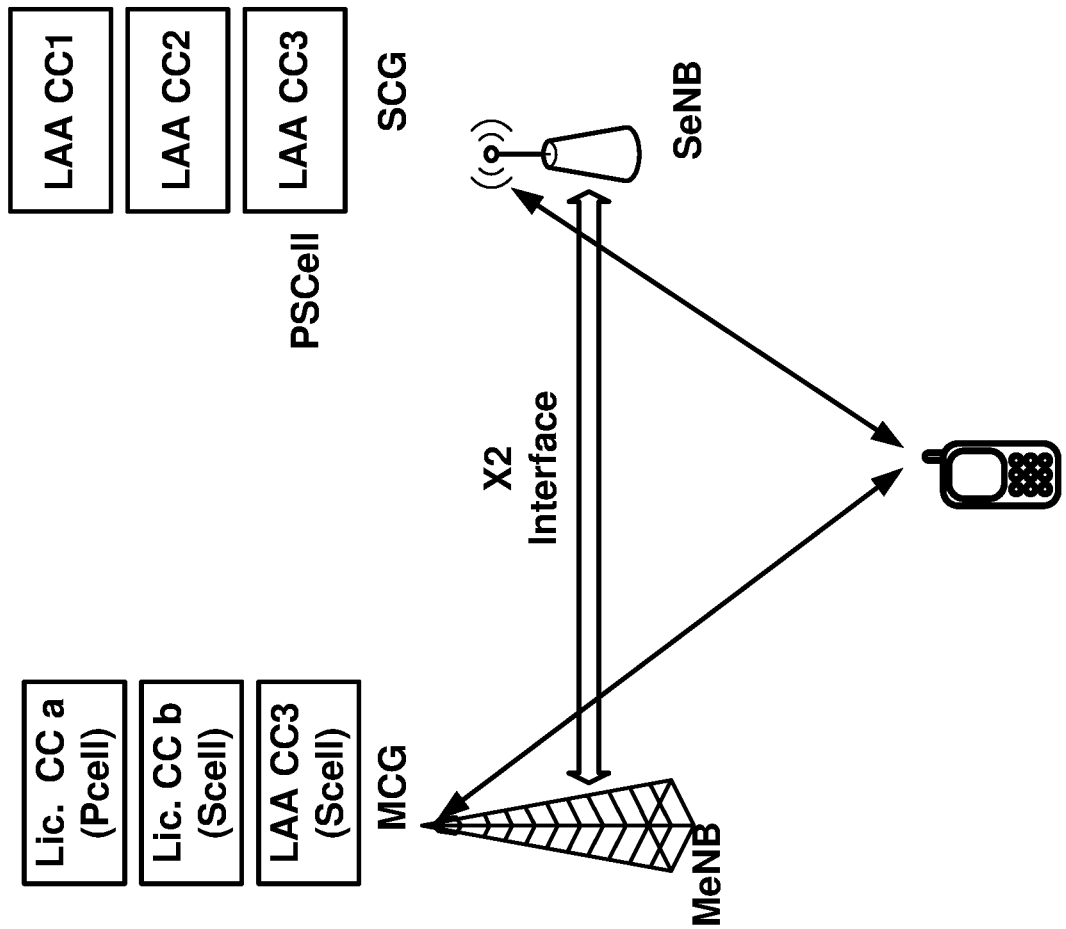
FIG. 14 is an example dual connectivity architecture as per aspect of an embodiment of the present disclosure.

In an example, a UE may be configured with plurality of cells. An example is shown in FIG. 14. The plurality of cells may be grouped to a first cell group and a second cell group. In an example, the plurality of cells may comprise one or more LAA cells. In an example, the first cell group may be a master cell group (MCG) and the second cell group may be a secondary cell group (SCG). In an example, a UE may communicate with a first base station (e.g., master eNB (MeNB)) over the MCG and the UE may communicate with a second base station (e.g., a secondary eNB (SeNB)) over the SCG. In an example, the first cell group may comprise a primary cell (PCell). In an example, the second cell group may comprise a primary secondary cell (PSCell). In an example, the UE may perform a contention based random access procedure over the PCell and/or over the PSCell. In an example, the UE may perform a random access process on an LAA cell of the SCG. In an example, the random access process on the LAA cell may be contention-based. In an example, the LAA cell may be a primary secondary cell. In an example, the random access process on the LAA cell may be contention-free. In an example, the LAA cell may be a secondary cell.

In an example, the SCG for a user may comprise of one or more LAA cell. In an example, the PSCell for a UE may be an LAA cell. The transmissions on LAA cells are subject to LBT. The legacy random access procedure may lead to unsuccessful and/or inefficient random access and network operation such as when the random access if performed on an LAA cell (e.g., when PSCell is an LAA cell).

Example embodiments enhance the random access preamble transmission when the PSCell is a LAA cell.

Figure 15:
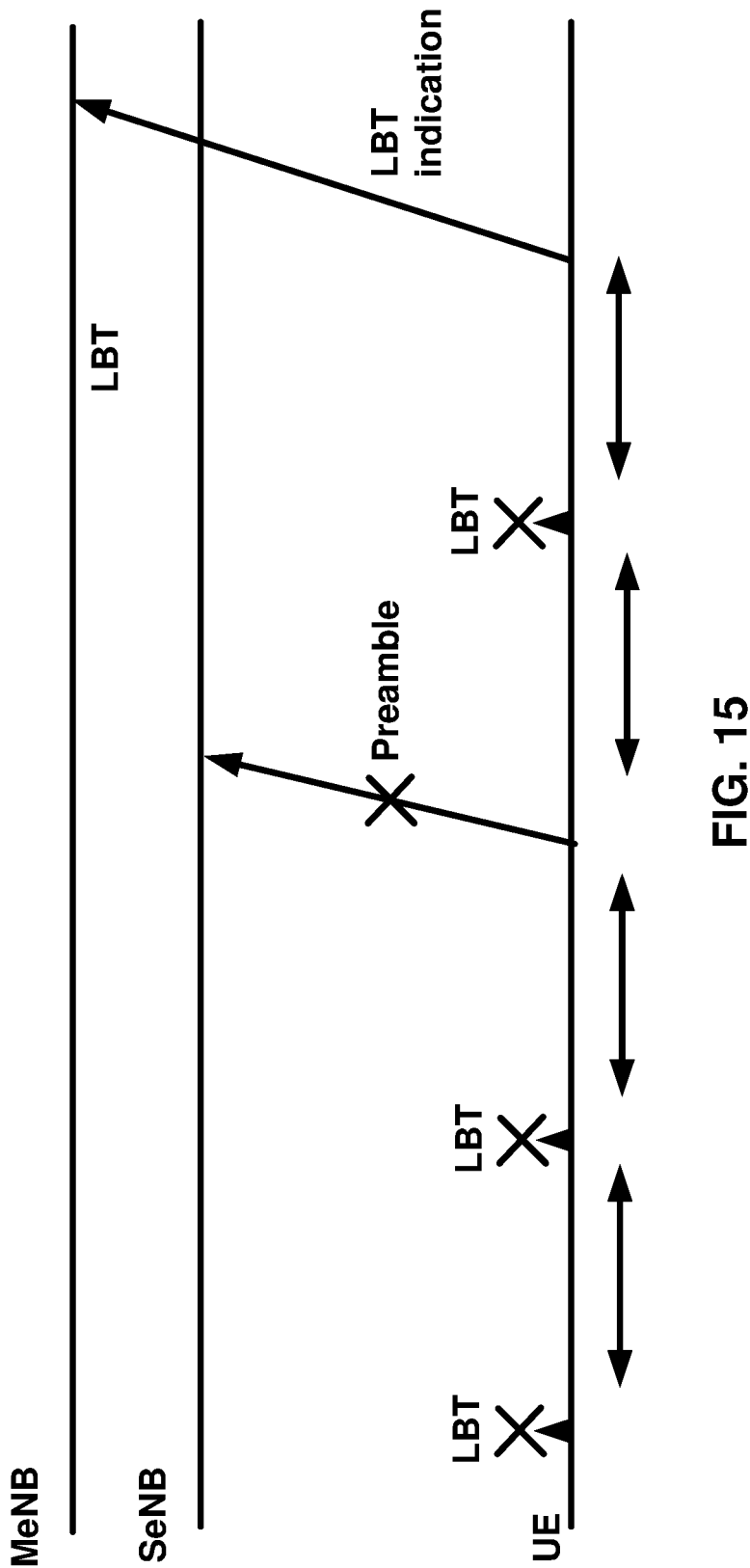
FIG. 15 is an example random access procedure as per aspect of an embodiment of the present disclosure.

In an example embodiment, a method may be used that comprises receiving from a first base station one or more radio resource control (RRC) messages. In an example, the one or more RRC messages may comprise configuration parameters of a plurality of cells. In an example, the plurality of cells may comprise a first cell group. In an example, the first cell group may comprise a licensed assisted access (LAA) cell. In an example, the method may comprise transmitting to a second base station a random access preamble (RAP) on the LAA cell if a listen before talk (LBT) procedure indicates clear channel on the LAA cell. In an example, the method may comprise incrementing a counter by one if no random access response (RAR) is received within a RAR window. In an example, the RAR may not be received due LBT indicating that the channel is occupied and the UE may not transmit the preamble. In an example, the RAR may not be received because the base station may not receive the preamble or may receive the preamble in error. In an example, the UE may increment the counter in response to the LBT indicating that the channel is occupied. In an example, the method may comprise transmitting a second message to the first base station if the counter reaches a first value. In an example, the second message may comprise one or more parameters related to the LBT procedure (See for example, FIG. 15). In an example, the RAR window may start at subframe that contains end of the RAP transmission plus three subframes. In an example, the one or more RRC messages comprise the RAR window size. In an example, the one or more RRC messages may comprise a first preamble transmission counter value. In an example, the first value may be the first preamble transmission counter value plus one. In an example, the one or more parameter indicates at least one of the number of unsuccessful attempts for LBT procedure, a number of successful attempts for LBT procedure, excessive LBT failures, a number of LBT attempts, the percentage of unsuccessful LBT attempts, or RACH failure on the LAA cell.

Figure 16:
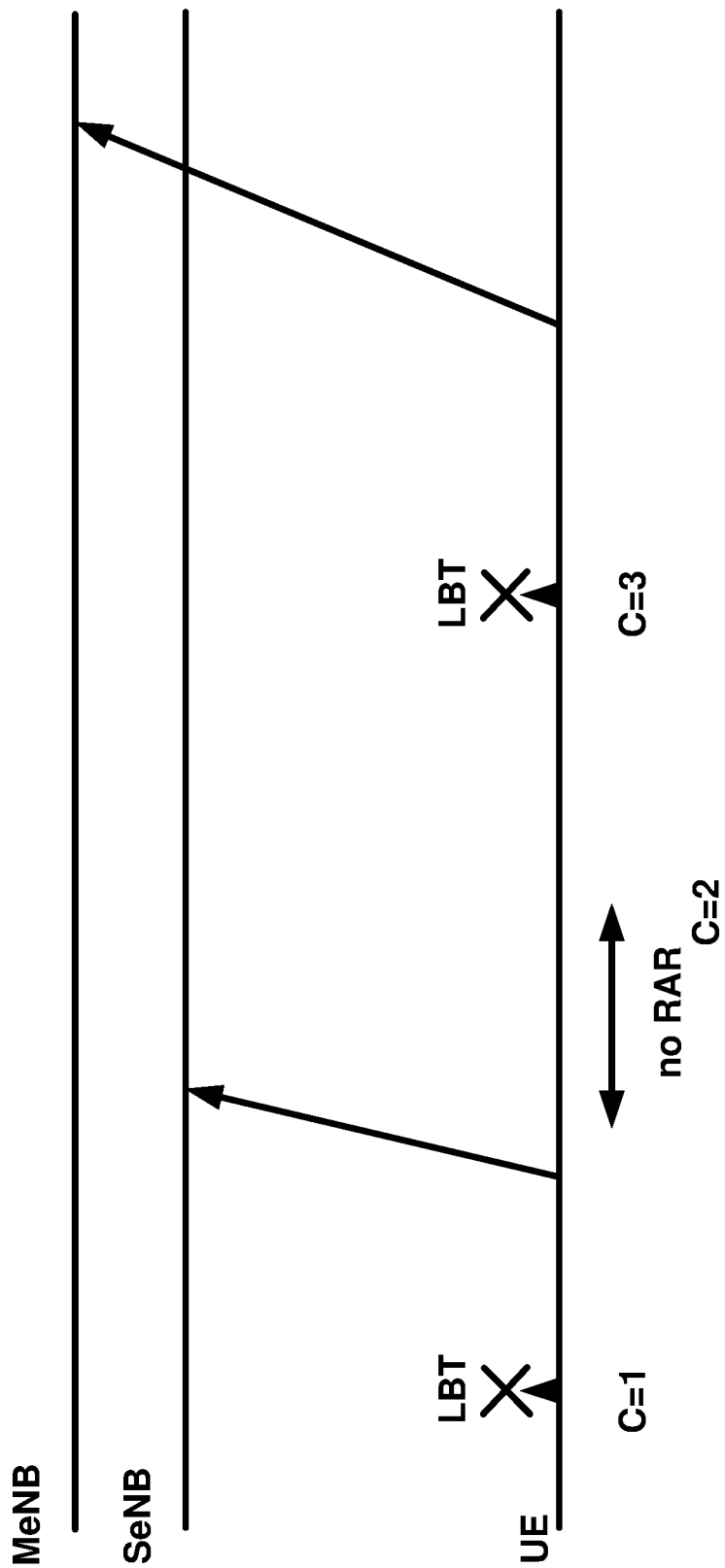
FIG. 16 is an example random access procedure as per aspect of an embodiment of the present disclosure.

In an example embodiment, a wireless device may use an example random access procedure on an LAA cell as shown in FIG. 16 in response to initiating a random access procedure. The wireless device may attempt to transmit a random access preamble to a secondary base station (e.g., SeNB) on an LAA cell in response to initiating the random access process. The wireless device may perform a LBT procedure to attempt to transmit the random access preamble on the LAA cell. The LBT procedure may comprise sensing the channel and/or comparing the detected energy level with an energy detection threshold. In an example, the base station may configure the wireless device with a counter. The wireless device may increment the counter in response to the LBT procedure for transmission of the preamble indicating that the channel is occupied. The LBT indicating that the channel is occupied may be called LBT failure. A preamble may not be transmitted on an LAA cell in response to LBT failure (e.g., the LBT procedure indicating that the channel is occupied). An example is shown in FIG. 16. In an example, the LBT procedure may indicate the channel is clear and the wireless device may transmit the preamble. The wireless may not receive a random access response (RAR) in response to transmitting the preamble. The wireless device may increment the counter in response to not receiving the RAR within a RAR window. An example is shown in FIG. 16. In an example, the wireless device may increment a first counter in response to the LBT procedure for transmission of the preamble indicating that the channel is occupied. In an example, the wireless device may increment a second counter in response to the LBT procedure for transmission of the preamble indicating that the channel is occupied or the wireless device not receiving a RAR in response to transmitting the preamble. The wireless device may determine that the random access process is failed in response to the counter reaching a first value. In an example, the first value may be RRC configured. The wireless may transmit one or more messages to a master base station (e.g., MeNB) in response to the failure of the random access process. In an example, the one or more message may indicate that the random access failure is due at least one LBT failure during the random access process. In an example, the one or more messages may indicate that the random access failure is due to a predetermined (e.g., a first number) of LBT failures during the random access process. In an example, the values of the counter and/or the first counter and/or the second counter may be used to determine whether the random access failure is due at least one and/or the predetermined number of LBT failure during the random access process.

In an example embodiment, a method may be used that comprises receiving from a first base station one or more radio resource control (RRC) messages. In an example, the one or more RRC messages comprising configuration parameters of a plurality of cells. In an example, the plurality of cells may comprise a first cell group. In an example, the first cell group may comprise a licensed assisted access (LAA) cell. In an example, the method may comprise repeatedly attempting to transmit random access preamble (RAP) to a second base station by performing listen before talk (LBT) procedure, until a random access response corresponding to the random access preamble is received or a predetermined number of attempts is reached. In an example, the method may comprise transmitting a second message to the first base station if the predetermined number of attempts is reached without receiving the random access response. In an example, the second message may comprise one or more parameters related to the LBT procedure. In an example, the one or more RRC messages may comprise a value that indicates the predetermined number of attempts. In an example, the one or more parameter indicates at least one of a number of unsuccessful attempts for LBT procedure, a number of successful attempts for LBT procedure, excessive LBT failures, a number of LBT attempts, the percentage of unsuccessful LBT attempts or RACH failure on the LAA cell.

Figure 17:
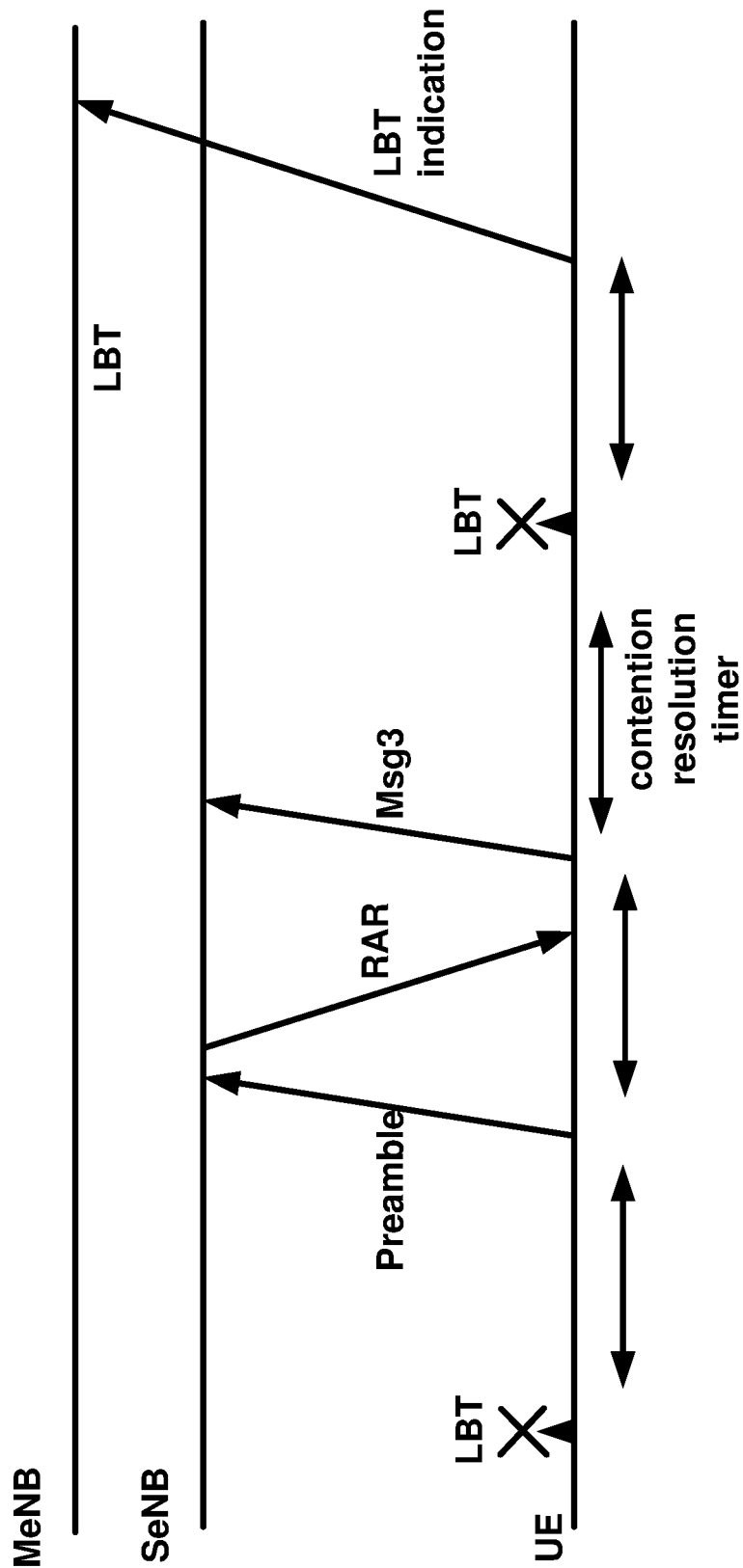
FIG. 17 is an example random access procedure as per aspect of an embodiment of the present disclosure.

In an example embodiment, a method may be used that comprises receiving from a first base station one or more radio resource control (RRC) messages. In an example, the one or more RRC messages may comprise configuration parameters of a plurality of cells. In an example, the plurality of cells may comprise a first cell group. In an example, the first cell group may comprise a licensed assisted access (LAA) cell. In an example, the method may comprise transmitting to a second base station a random access preamble (RAP) on the LAA cell if a listen before talk (LBT) procedure indicates clear channel on the LAA cell. In an example, the method may comprise incrementing a counter by one in response to no random access response (RAR) being received within a RAR window, or contention resolution being unsuccessful (See for example, FIG. 17). In an example, the method may comprise transmitting a second message to the first base station if the counter reaches a first value. In an example, the second message may comprise one or more parameter related to the LBT procedure. In an example, the RAR window may start at subframe that contains end of the RAP transmission plus three subframes. In an example, the one or more RRC messages may comprise the RAR window size. In an example, the one or more RRC messages may comprise a first preamble transmission counter value and the first value may be the first preamble transmission counter value plus one. In an example, the one or more parameter indicates at least one of a number of unsuccessful attempts for LBT procedure, a number of successful attempts for LBT procedure, excessive LBT failures, a number of LBT attempts, the percentage of unsuccessful LBT attempts, or RACH failure on the LAA cell.

In an example, once the Random Access Preamble is transmitted and regardless of the possible occurrence of a measurement gap or a Sidelink Discovery Gap for Transmission or a Sidelink Discovery Gap for Reception, the MAC entity may monitor the PDCCH of the SpCell for Random Access Response(s) identified by the RA-RNTI defined below, in the RA Response window which may start at the subframe that contains the end of the preamble transmission plus three subframes and has length ra-ResponseWindowSize. In an example, the RA-RNTI associated with the PRACH in which the Random Access Preamble is transmitted, may be computed as RA-RNTI=1+t_id+10*f_id, where t_id is the index of the first subframe of the specified PRACH ($0 \le t\_id < 10$), and f_id is the index of the specified PRACH within that subframe, in ascending order of frequency domain ($0 \le f\_id < 6$). In an example, the MAC entity may stop monitoring for Random Access Response(s) after successful reception of a Random Access Response containing Random Access Preamble identifiers that matches the transmitted Random Access Preamble.

In an example, a power ramping suspension indication may be provided from PHY also for dropping of preamble transmissions due to LBT. Example embodiments enhance RAR reception when PSCell is a LAA cell.

Figure 18:
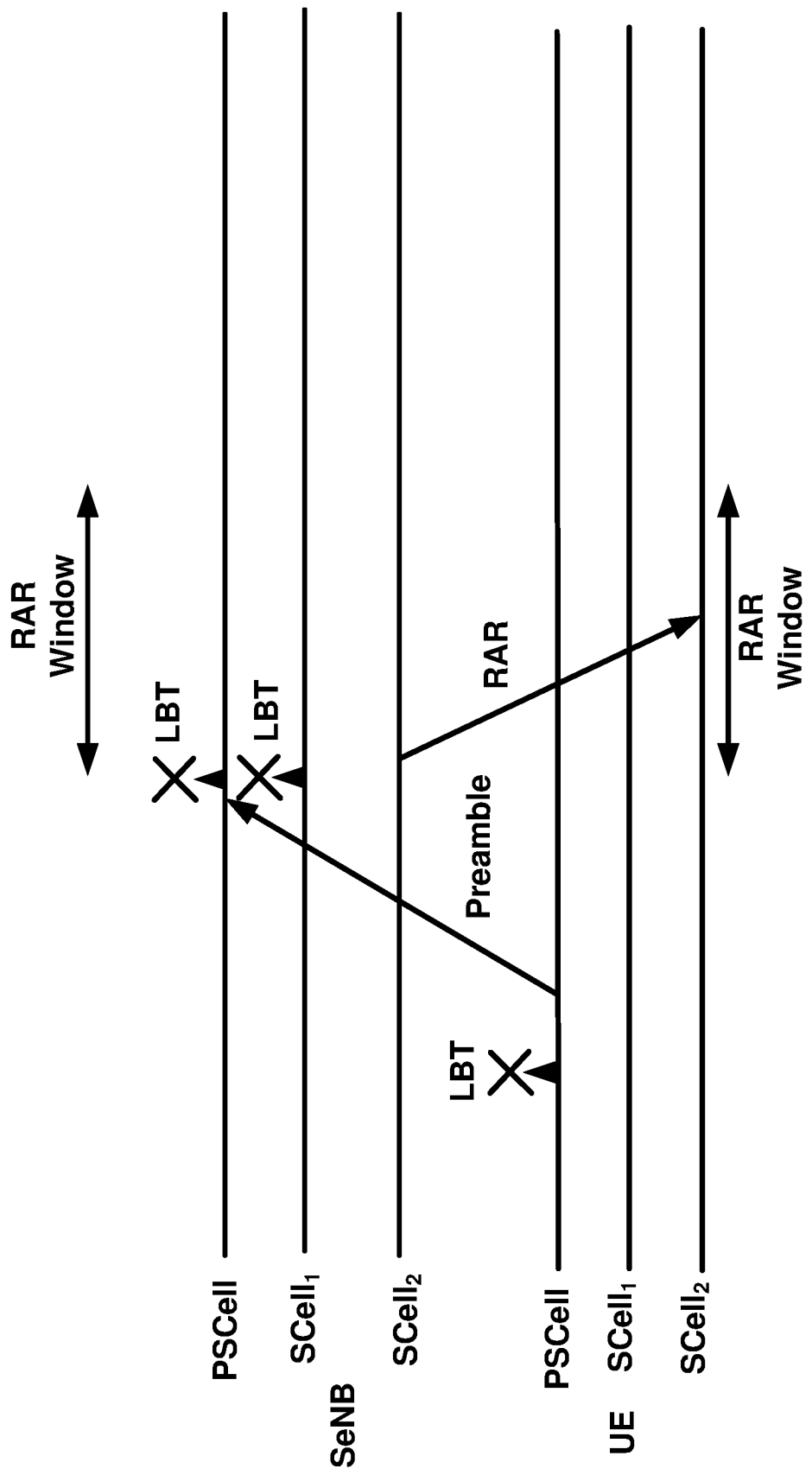
FIG. 18 is an example random access procedure as per aspect of an embodiment of the present disclosure.

In an example embodiment, an SeNB may receive one or more random access preamble form one or more UE. The SeNB may transmit a message (e.g., Msg2) to one or more UEs in response to one or more random access preamble. The message may comprise one or more random access response (RAR) addressed to one or more UEs. In an example the CRC for the PDCCH comprising the scheduling assignment for the Msg2 may be scrambled with a random access RNTI (RA-RNTI). In an example, the RA-RNTI may depend on the resource (e.g., subframe and/or frequency domain resource) used for preamble transmission. In an example, the SeNB may consider the common cells (e.g., common active cells) of the UEs that the message is addressed to (e.g., PSCell and zero or more SCells). In an example, the common cells may comprise of LAA cells. In an example, the common cells may comprise licensed and LAA cells. In an example, the SeNB may transmit the message on one or more licensed cell (e.g., if any) of the common cells and/or on one or more of the LAA cells of the common cells after evaluating the LBT on the one or more LAA cells and if the LBT indicates clear channel (See for example, FIG. 18). In an example, a UE that has transmitted a preamble monitors RA-RNTI on its PSCell and/or one or more cells of the SCG during the RAR window.

In an example embodiment, an SeNB may receive one or more random access preamble form one or more UE. The SeNB may transmit a message (e.g., Msg2) to one or more UEs in response to one or more random access preamble. The message may comprise one or more random access responses (RARs) addressed to one or more UEs. In an example, the SeNB may group the UEs that the message is addressed to (e.g., based on the number of common active cells in a group, availability of licensed and/or LAA cells in a group, etc.). In an example, a group may comprise of one UE. In an example, the SeNB may transmit the message on one or more licensed cell of the common cells in a group (e.g., if any) and/or on one or more of the LAA cells in the group after evaluating the LBT on the LAA cells of the group and if the LBT indicates clear channel (See for example, FIG. 18). In an example, a UE that has transmitted a preamble monitors RA-RNTI on its PSCell and/or one or more cells of the SCG during the RAR window.

Figure 19:
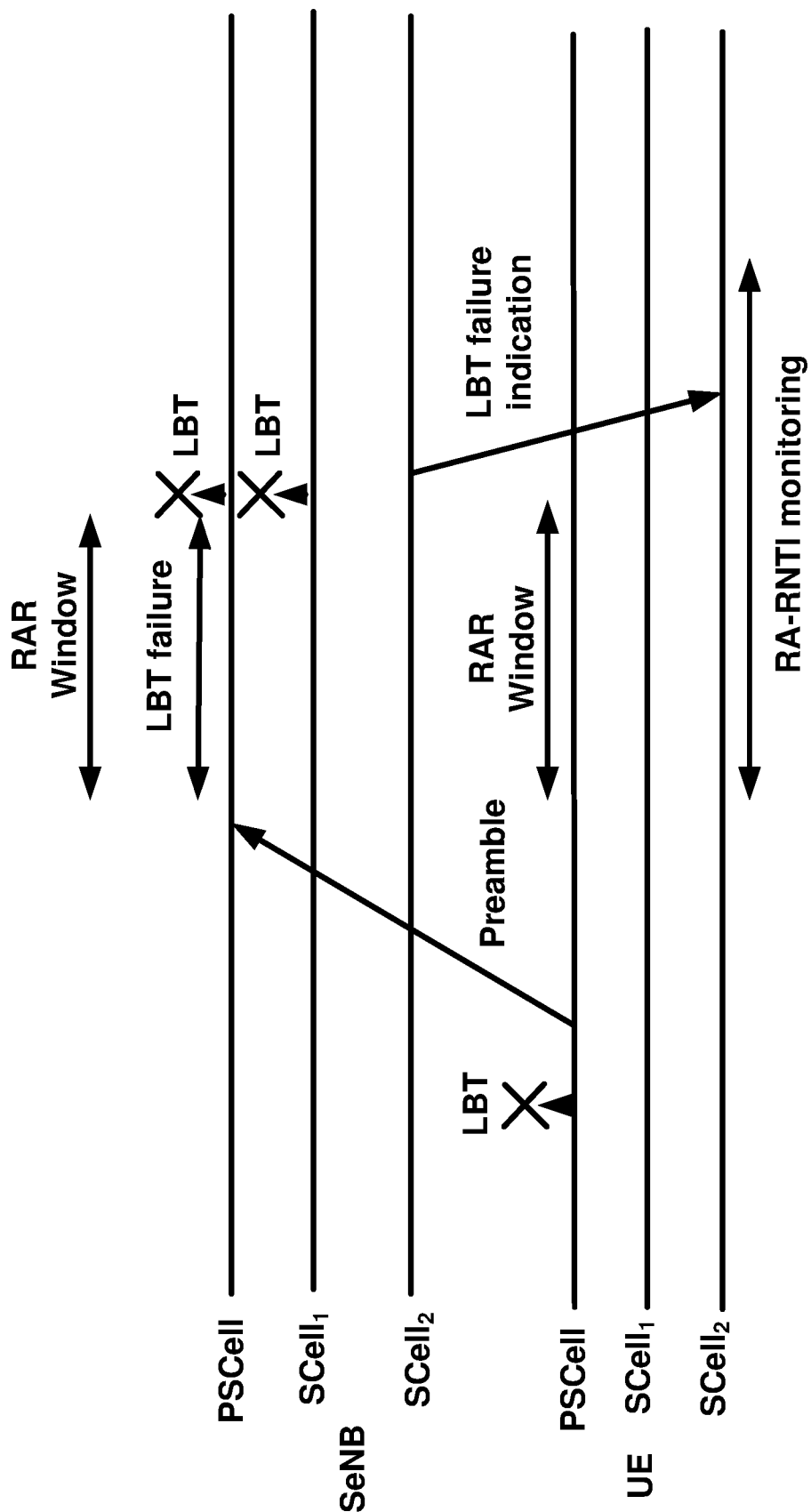
FIG. 19 is an example random access procedure as per aspect of an embodiment of the present disclosure.

In an example embodiment, an SeNB may receive one or more random access preamble form one or more UE. The SeNB may transmit a message (e.g., Msg2) to one or more UEs in response to one or more random access preamble. The message may comprise one or more random access response (RAR) addressed to one or more UEs. In an example embodiment, if the SeNB may not transmit the message during the RAR window due to LBT not indicating clear channel, SeNB may indicate the LBT failure to the UEs that the message is addressed to (See for example, FIG. 19). In an example, the one or more UEs may not power ramp up and may not increment preamble transmission counter after receiving the LBT failure indication from SeNB. In an example, the LBT failure indication by SeNB may be sent using UE specific signaling (e.g., MAC CE, dedicated RRC signaling, etc.). In an example, the SeNB may send the LBT failure indication on one or more licensed cell of the UE (e.g., if any) and/or one or more LAA cell of the UE after evaluating the LBT on the LAA cells of the UE and if LBT indicates clear channel.

In an example embodiment, an SeNB may receive one or more random access preamble form one or more UE. The SeNB may transmit a message (e.g., Msg2) to one or more UEs in response to one or more random access preamble. The message may comprise one or more random access response (RAR) addressed to one or more UEs. In an example embodiment, if the SeNB may not transmit the message during the RAR window due to LBT not indicating clear channel, SeNB may indicate the LBT failure to the UEs that the message is addressed to (See for example, FIG. 19). In an example, the one or more UEs may not power ramp up and may not increment preamble transmission counter after receiving the LBT failure indication from SeNB. In an example, the SeNB may send the LBT failure indication using common signaling (e.g., common PDCCH). In an example, the SeNB may consider cells that are common to all UEs that the message is addressed to. In an example, the common cells may comprise of LAA cells. In an example, the common cells may comprise both licensed and LAA cells. In an example, the SeNB may send the LBT failure indication on one or more licensed cell (e.g., if any) of the common cells and/or on one or more of the LAA cells after evaluating the LBT on the LAA cells and if the LBT indicates clear channel. In an example, common PDCCH can be addressed to RA-RNTI. In an example, a UE may be configured to monitor RA-RNTI on one or more of SCG cells during a window at least as long as RAR window. In an example, a new window may be configured for the UE and the UE may monitor RA-RNTI on one or more of SCG cells during the window. In an example, the window configuration may comprise the window size. In an example, the UE may start monitoring the RA-RNTI K subframes after the RAP transmission end (e.g., K=3) and for the duration of window size. In an example, RRC may configure the parameters of the window (e.g., window size). In an example, the RRC configuration may indicate the additional number of subframes that UE may monitor the RA-RNTI on the one or more SCG cells during and/or after the RAR window size.

Example embodiments enhance the transmission of Msg3 by a UE when PSCell is a LAA cell.

Figure 20:
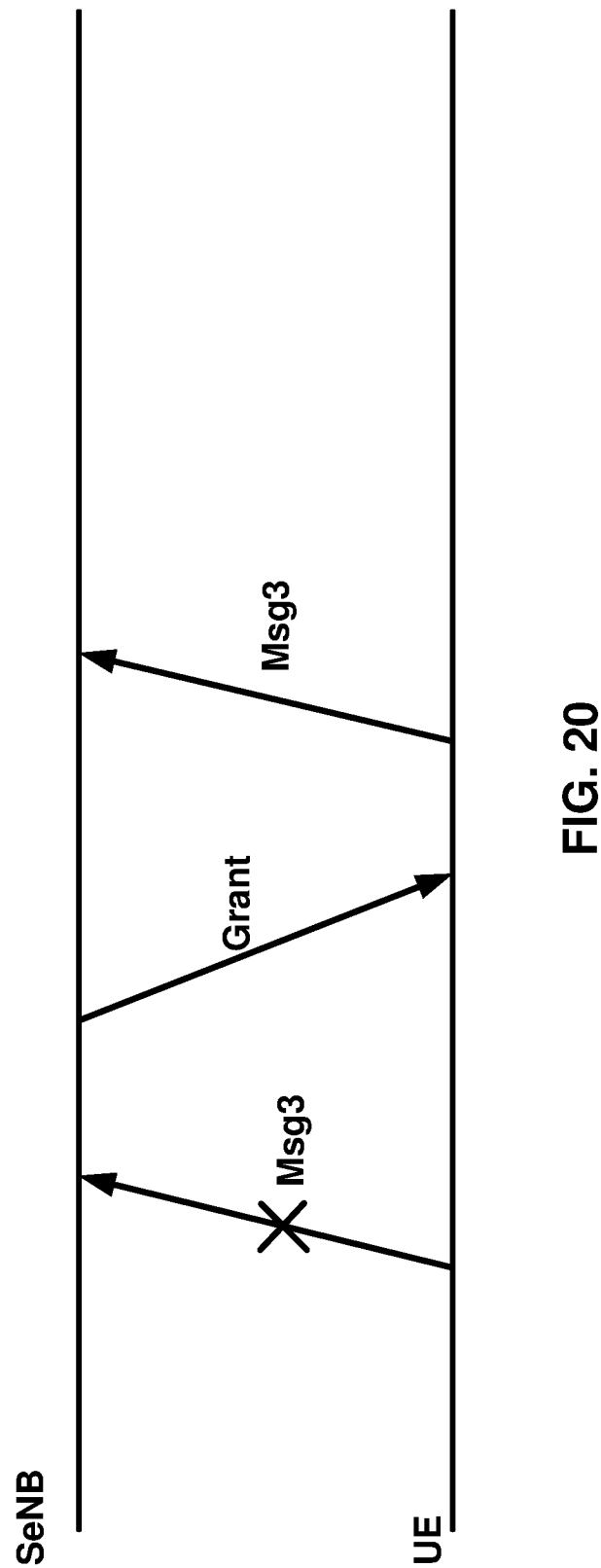
FIG. 20 is an example random access procedure as per aspect of an embodiment of the present disclosure.
Figure 21:
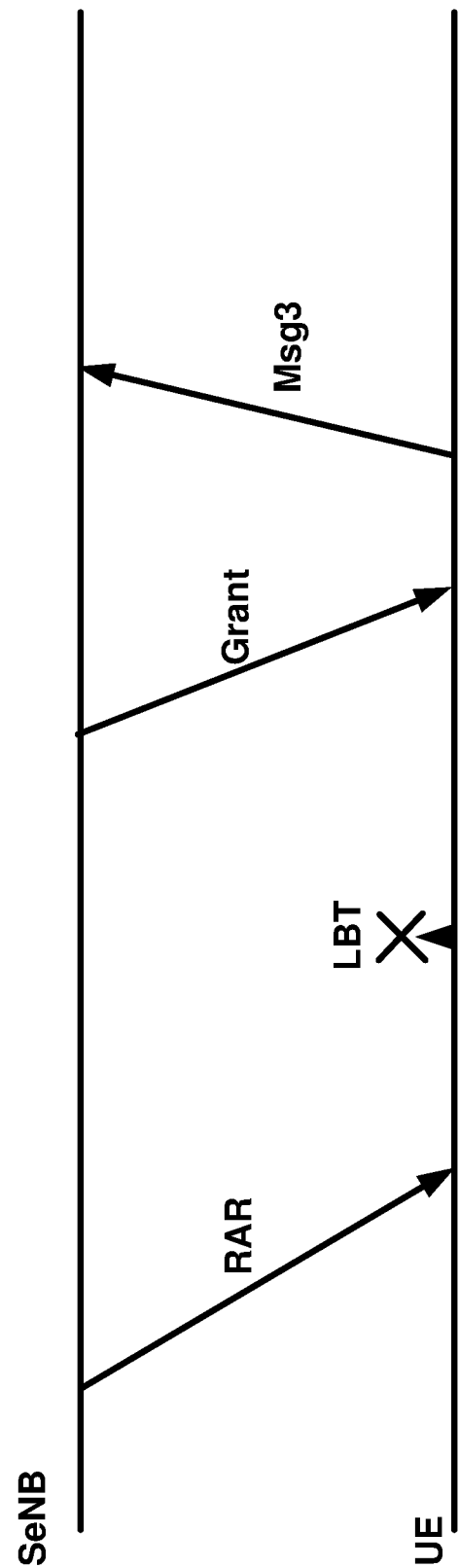
FIG. 21 is an example random access procedure as per aspect of an embodiment of the present disclosure.

In an example embodiment, a UE may transmit a message (e.g., Msg3) to a first base station (e.g., SeNB) in response to a RAR. In an example, the UE may receive the RAR on PSCell. In an example, the PSCell may be a LAA cell. In an example, the UE may use the parameters in a grant in the RAR to determine the resources and create a transport block (TB) for transmission of the message. In an example, the UE may not transmit the Msg3 on the PSCell due to unsuccessful LBT (e.g., the LBT may not indicate a clear channel). In an example, the UE may consider dropped Msg3 due to LBT as a performed and failed transmission. In an example, SeNB after not receiving Msg3 at the allocated subframe may consider it as a failed transmission. In an example, the SeNB may transmit a new grant for a UE whose transmission/retransmission of the message fails (See for example, FIG. 20 or FIG. 21). The grant may enable asynchronous or synchronous retransmissions (e.g., the new grant may be transmitted after 4 or more subframes). In an example, the new grant may be transmitted using a new Msg2 with the same RA-RNTI but excluding UEs whose Msg3 is received correctly. In an example, a UE needs to monitor RA-RNTI after transmitting Msg3. In an example, for synchronous transmission, the UE needs to monitor RA-RNTI 4 subframes after transmitting Msg3.

In an example embodiment, a UE may transmit a message (e.g., Msg3) to a first base station (e.g., SeNB) in response to a RAR. In an example, the UE may receive the RAR on PSCell. In an example, the PSCell may be a LAA cell. In an example, the UE may use the parameters in a grant in the RAR to determine the resources and create a transport block (TB) for transmission of the message. In an example, UE may not transmit the Msg3 on the PSCell due to unsuccessful LBT (e.g., the LBT may not indicate a clear channel). In an example, the UE may consider dropped Msg3 due to LBT as a performed and failed transmission. In an example, SeNB after not receiving Msg3 at the allocated subframe may consider it as a failed transmission. In an example, the SeNB may transmit a new grant for a UE whose transmission/retransmission of the message fails (See for example, FIG. 20 or FIG. 21). The grant may enable asynchronous or synchronous retransmissions (e.g., the new grant may be transmitted after 4 or more subframes). In an example, the new grant may be transmitted using a UE-specific grant addressed to Temporary C-RNTI or C-RNTI. In an example, the UE monitors Temporary C-RNTI if UE received one in Msg2 and checks if the SeNB has transmitted a new grant for (re)transmission of Msg3. In an example, the UE monitors C-RNTI and checks if the SeNB has transmitted a new grant for (re)transmission of Msg3.

Figure 22:
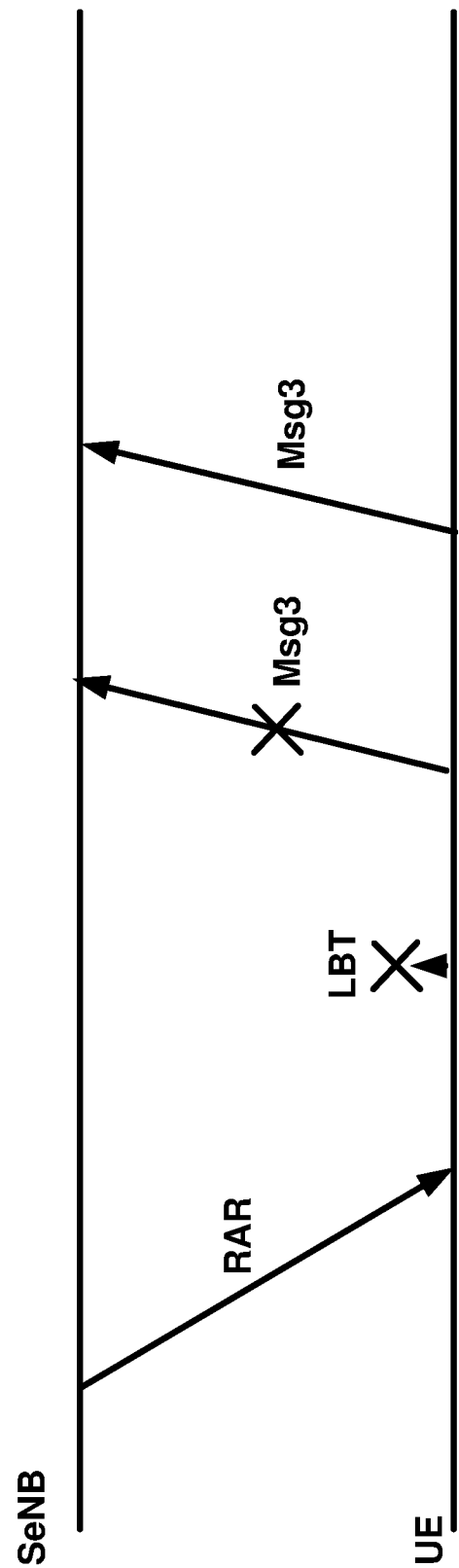
FIG. 22 is an example random access procedure as per aspect of an embodiment of the present disclosure.

In an example embodiment, a UE may transmit a message (e.g., Msg3) to a first base station (e.g., SeNB) in response to a RAR. In an example, the UE may receive the RAR on PSCell. In an example, the PSCell may be a LAA cell. In an example, the UE may use the parameters in a grant in the RAR to determine the resources and create a transport block (TB) for transmission of the message. In an example, UE may not transmit the Msg3 on the PSCell due to unsuccessful LBT (e.g., the LBT may not indicate a clear channel). In an example, the UE may consider dropped Msg3 due to LBT as a performed and failed transmission. In an example, SeNB after not receiving Msg3 at the allocated subframe may consider it as a failed transmission. In an example, the grant in RAR may be persistent and may be valid for every K subframes (e.g., K=8) (See for example, FIG. 22). In an example, the UE may continuously transmit the Msg3 every K subframes for maxHARQ-Msg3Tx number of times or until it receives Msg4 whichever is earlier.

In an example embodiment, a UE may transmit a message (e.g., Msg3) to a first base station (e.g., SeNB) in response to a RAR. In an example, the UE may receive the RAR on PSCell. In an example, the PSCell may be a LAA cell. In an example, the UE may use the parameters in a grant in the RAR to determine the resources and create a transport block (TB) for transmission of the message. In an example, UE may not transmit the Msg3 on the PSCell due to unsuccessful LBT (e.g., the LBT may not indicate a clear channel). In an example, the UE may not power ramp or increment preamble transmission counter after LBT failure for max-HARQ-Msg3Tx times.

Figure 23:
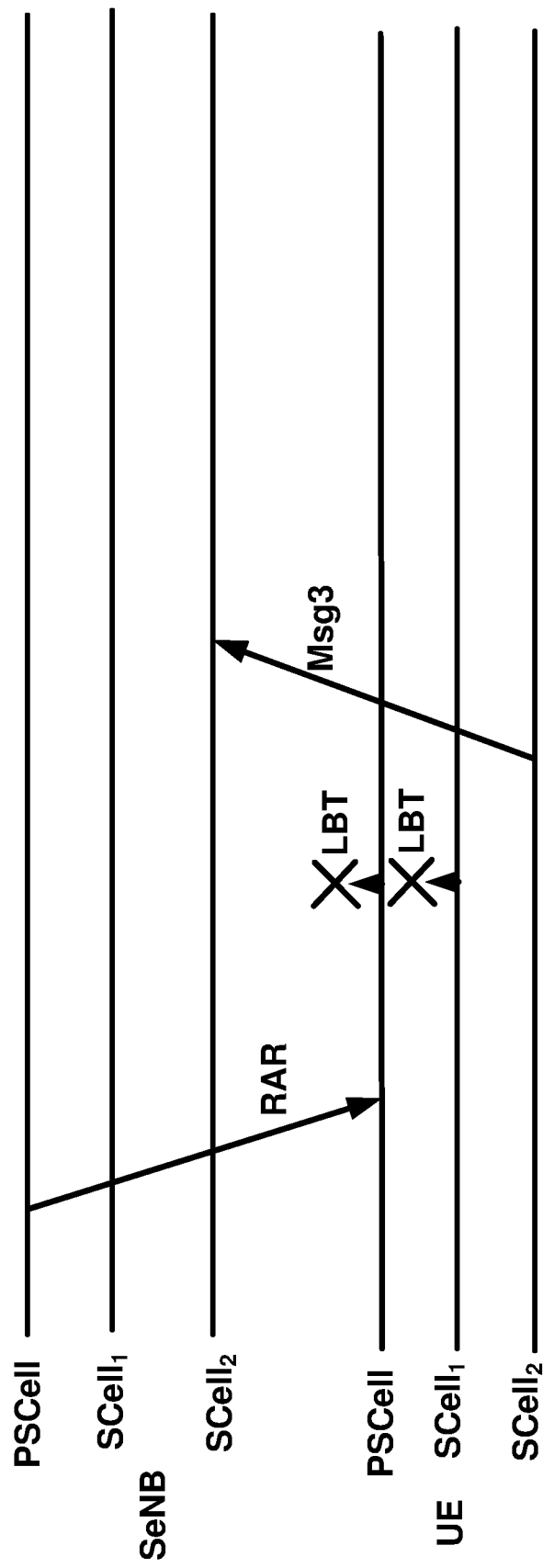
FIG. 23 is an example random access procedure as per aspect of an embodiment of the present disclosure.

In an example embodiment, a UE may transmit a message (e.g., Msg3) to a first base station (e.g., SeNB) in response to a RAR. In an example, the UE may receive the RAR on PSCell. In an example, the PSCell may be a LAA cell. In an example, the UE may use the parameters in a grant in the RAR to determine the resources and create a transport block (TB) for transmission of the message. In an example, the grant in RAR may be valid for any cell of SCG. In an example, the UE may transmit Msg3 on a cell in SCG whose LBT is successful (See for example, FIG. 23). In an example, the UE may transmit Msg3 on one or more cells of the SCG whose LBT indicate a clear channel based on a rule. In an example, the rule may comprise considering the cell index.

In an example embodiment, a UE may transmit a message (e.g., Msg3) to a first base station (e.g., SeNB) in response to a RAR. In an example, the UE may receive the RAR on PSCell. In an example, the PSCell may be a LAA cell. In an example, the UE may use the parameters in a grant in the RAR to determine the resources and create a transport block (TB) for transmission of the message. In an example, UE may not transmit the Msg3 on the PSCell due to unsuccessful LBT (e.g., the LBT may not indicate a clear channel). In an example, once Msg3 transmission or retransmission is attempted (e.g., irrespective of whether LBT is successful or not), the MAC entity may start mac-ContentionResolutionTimer and restart mac-ContentionResolutionTimer at each HARQ retransmission attempt.

Figure 24:
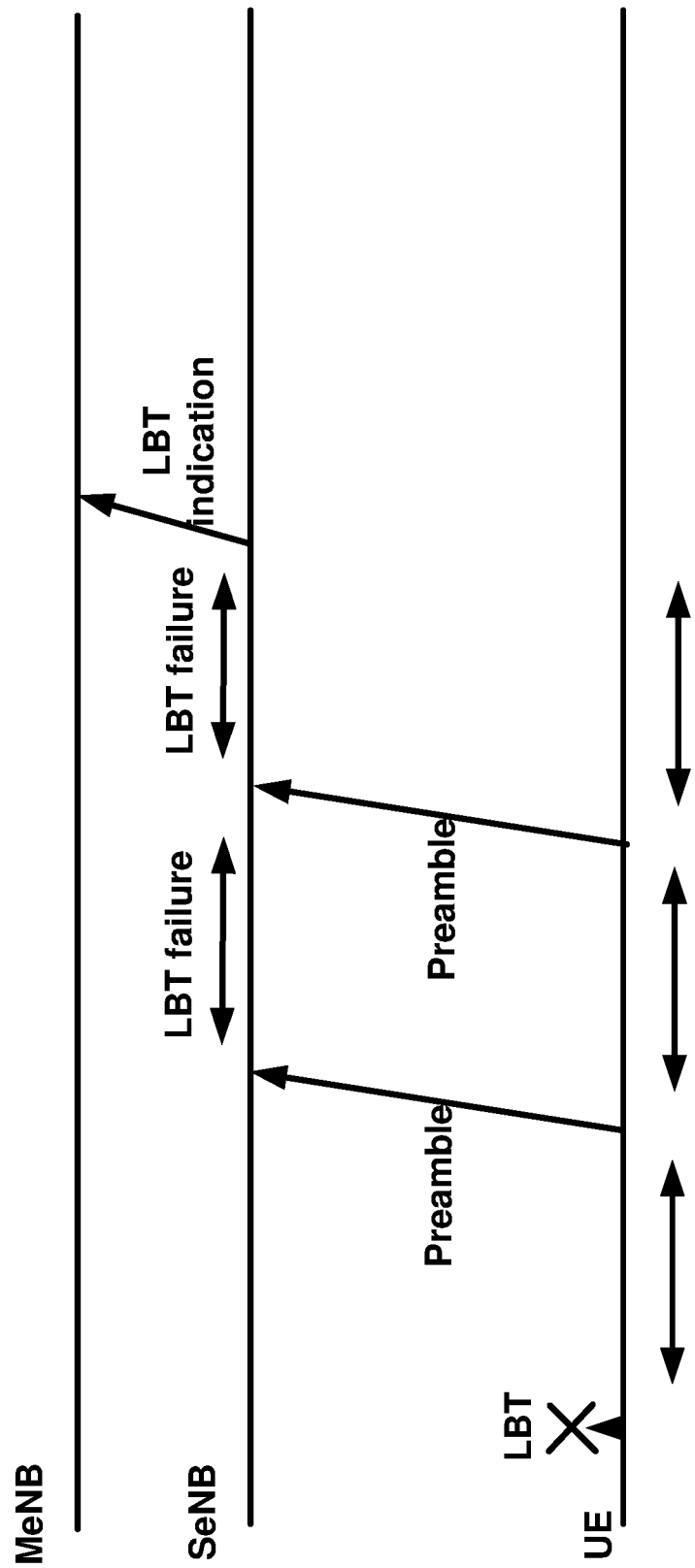
FIG. 24 is an example random access procedure as per aspect of an embodiment of the present disclosure.

In an example embodiment, a method may be used that comprises repeatedly receiving by a first base station from a wireless device a random access preamble (RAP) on a licensed assisted access (LAA) cell. In an example, the method may comprise repeatedly attempting to transmit by the first base station to the wireless device on the LAA cell a random access response (RAR) within a RAR window in response to the RAP if a listen before talk (LBT) procedure indicates clear channel on the LAA cell. In an example, the method may comprise transmitting by the first base station to a second base station a message if the LBT procedure on the LAA cell indicates a busy channel and the second base station cannot transmit the RAR in response to a first configured number of one or more RAPs (See, for example, FIG. 24). In an example, the message may comprise one or more parameter related to the LBT procedure. In an example, the first configured number is one. In an example, the first configured number is configured employing an RRC message. In an example the first configured number is pre-configured at a constant value. In an example, the one or more parameter indicates at least one of excessive LBT failures, indication that the RAR response cannot be sent due to LBT (e.g., in response to a first configured number of one or more RAPs), RACH failure on the LAA cell.

Example embodiment enhance transmission of Msg4 and/or contention resolution when PSCell is a LAA cell.

In an example embodiment, after a UE transmits Msg3 and the SeNB decodes the Msg3 correctly, the SeNB may transmit a new message (e.g., Msg4) to the UE. In an example, the SeNB may self-carrier schedule Msg4 on a SCell other than PSCell. SeNB may self-schedule and transmit Msg4 on one or more licensed cell (e.g., if any) or one or more LAA cell after LBT evaluation and if LBT indicates clear channel. In an example, UE may monitor temporary C-RNTI on PSCell and/or other cells of the SCG to decode the downlink scheduling assignment for the Msg4.

Figure 25:
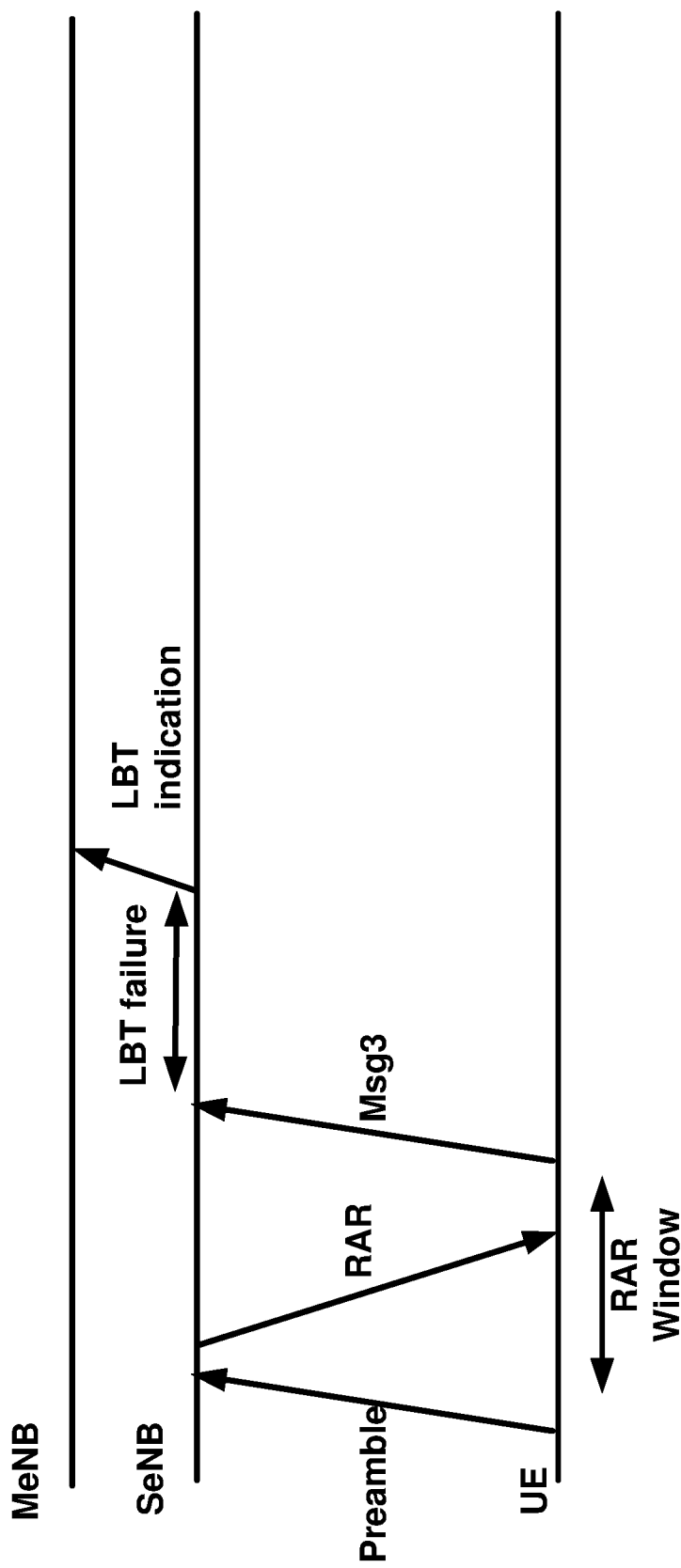
FIG. 25 is an example random access procedure as per aspect of an embodiment of the present disclosure.

In an example embodiment, a method may be used that comprises receiving by a first base station from a wireless device a first message (e.g., Msg3) on a licensed assisted access (LAA) cell. The method may comprise attempting to transmit by the first base station to the wireless device on the LAA cell a second message (e.g., Msg4) in response to the first message if a listen before talk (LBT) procedure indicates clear channel on the LAA cell. In an example, the method may comprise transmitting by the first base station to a second base station a third message if the LBT procedure on the LAA cell indicates a busy channel for a first configured duration of time. An example is shown in FIG. 25. In an example, the first configured duration of time may be a first configured number of subframes. In an example, the third message may comprise one or more parameter related to the LBT procedure. In an example, the one or more parameter indicates at least one of excessive LBT failures, indication that the third message cannot be sent due to LBT, RACH failure on the LAA cell.

In an example, excessive LBT may indicate a threshold number of consecutive LBT failures take place. In an example, the threshold value may be configured. In an example, the threshold value may be configured with RRC. In an example, the excessive LBT may indicate if at least P attempts (or P percentage) of the last L LBT attempts fail. In an example, the P and L values may be configured for the UE. In an example, the P and the L values may be RRC configured.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 26:
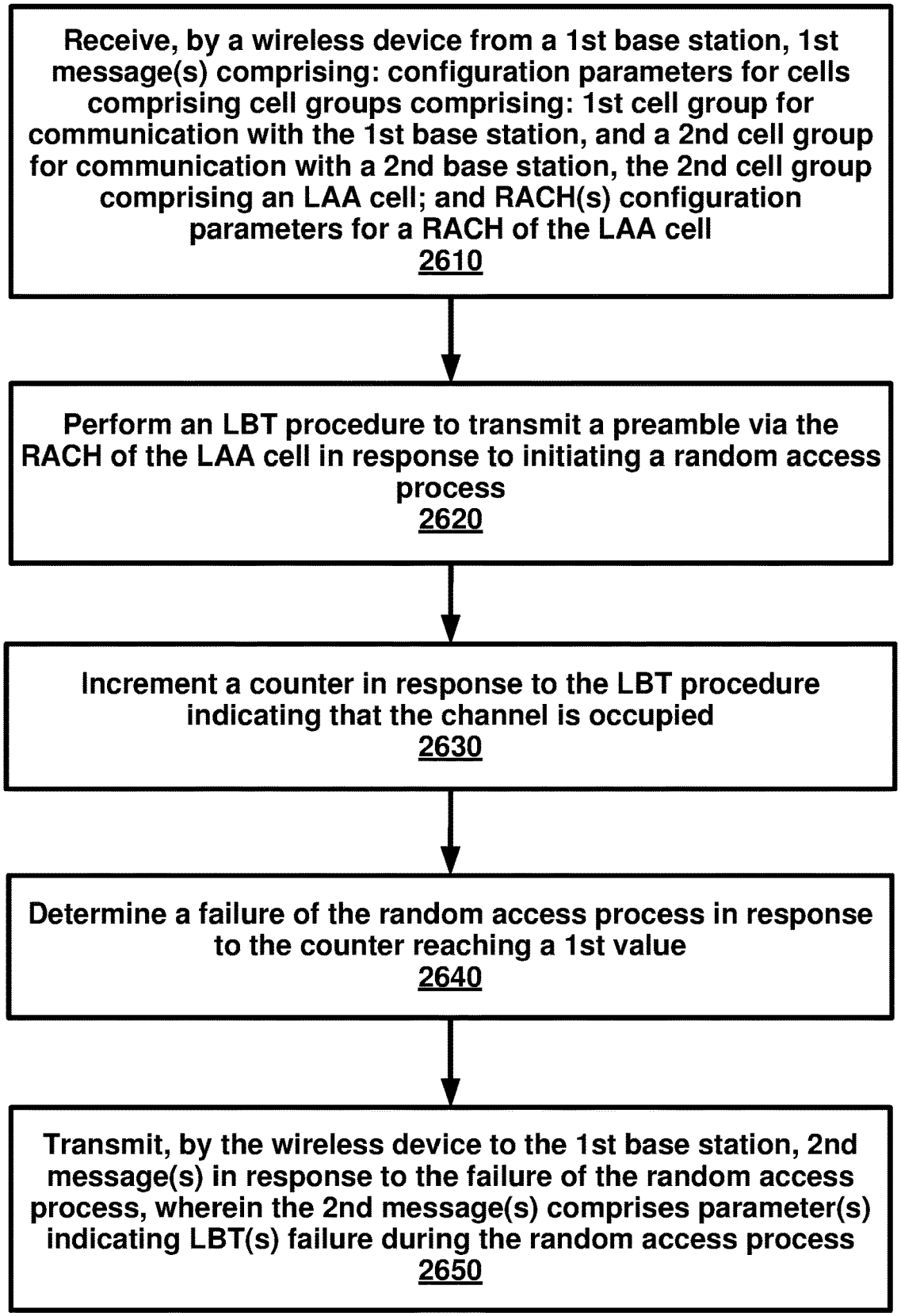
FIG. 26 is an example flow diagram as per an aspect of an embodiment of the present disclosure.

FIG. 26 is an example flow diagram as per an aspect of an embodiment of the present disclosure. At 2610, a wireless device may receive one or more messages from a first base station. The message may comprise configuration parameters for a plurality of cells comprising a plurality of cell groups. The plurality of cell groups may comprise a first cell group for communication with the first base station, and a second cell group for communication with a second base station. The second cell group may comprise a licensed assisted access (LAA) cell, and one or more random access channel (RACH) configuration parameters for a RACH of the LAA cell.

At 2620, the wireless device may perform a listen before talk (LBT) procedure to transmit a preamble via the RACH of the LAA cell in response to initiating a random access process. At 2630, the wireless device may increment a counter in response to the LBT procedure indicating that the channel is occupied.

At 2640, the wireless device may determine a failure of the random access process in response to the counter reaching a first value. At 2650, the wireless device may transmit to the first base station, at least one second message in response to the failure of the random access process. The at least one second message may comprise one or more parameters indicating at least one LBT failure during the random access process.

According to an embodiment, the failure may be due to a first number of LBT failures during the random access process. According to an embodiment, the configuration parameters may comprise the first number.

According to an embodiment, the wireless device may increment the counter in response to not receiving a random access response (RAR) within a RAR window in response to transmitting the preamble, wherein the preamble is transmitted in response to the LBT procedure indicating a clear channel.

According to an embodiment, the RAR window may start at a subframe that contains end of the preamble transmission plus a first predetermined number of subframes.

According to an embodiment, the RACH configuration parameter may comprise the RAR window. According to an embodiment, the wireless device may monitor a control channel associated with a random access radio network temporary identifier in response to transmitting the preamble.

According to an embodiment, the RACH configuration parameters may indicate a plurality of RACH resources for the LAA cell. According to an embodiment, LBT procedure may comprise sensing the LAA cell before transmitting the preamble. According to an embodiment, the configuration parameters may comprise one or more LBT parameters for the LBT procedure.

Figure 27:
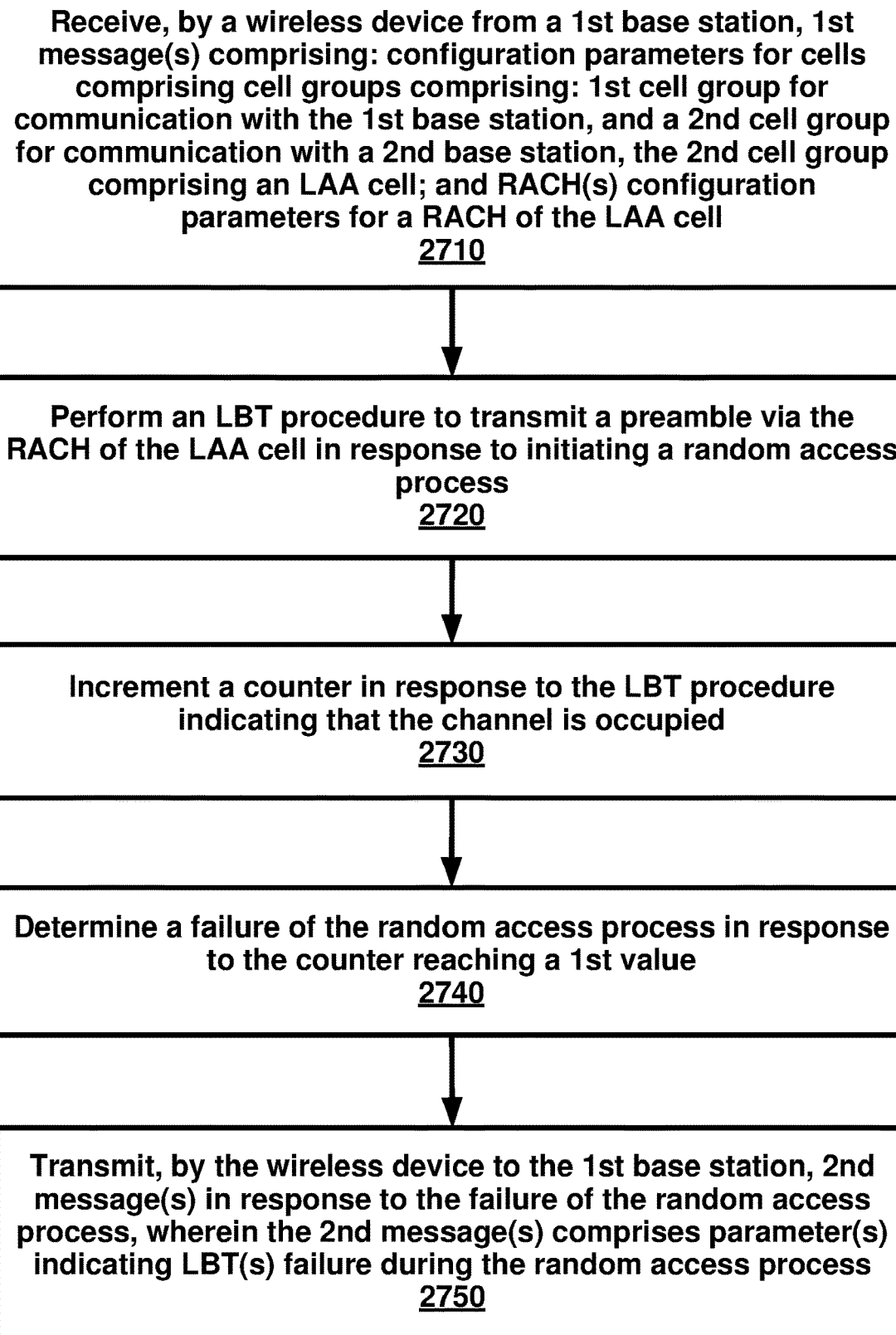
FIG. 27 is an example flow diagram as per an aspect of an embodiment of the present disclosure.

FIG. 27 is an example flow diagram as per an aspect of an embodiment of the present disclosure. At 2710, a wireless device may receive one or more messages from a first base station. The message may comprise configuration parameters for a plurality of cells comprising a plurality of cell groups. The plurality of cell groups may comprise a first cell group for communication with the first base station, and a second cell group for communication with a second base station. The second cell group may comprise a licensed assisted access (LAA) cell, and one or more random access channel (RACH) configuration parameters for a RACH of the LAA cell. At 2720, the wireless device may perform a listen before talk (LBT) procedure to transmit a preamble via the RACH of the LAA cell in response to initiating a random access process. At 2730, the wireless device may increment a counter in response to the LBT procedure indicating that the channel is occupied.

At 2740, the wireless device may determine a failure of the random access process in response to the counter reaching a first value. At 2750, the wireless device may transmit to the first base station, at least one second message in response to the failure of the random access process. The at least one second message may comprise one or more parameters indicating at least one LBT failure during the random access process.

According to an embodiment, the failure may be due to a first number of LBT failures during the random access process. According to an embodiment, the configuration parameters may comprise the first number.

According to an embodiment, the wireless device may increment the counter in response to not receiving a random access response (RAR) within a RAR window in response to transmitting the preamble, wherein the preamble is transmitted in response to the LBT procedure indicating a clear channel.

According to an embodiment, the RAR window may start at a subframe that contains end of the preamble transmission plus a first predetermined number of subframes.

According to an embodiment, the RACH configuration parameter may comprise the RAR window. According to an embodiment, the wireless device may monitor a control channel associated with a random access radio network temporary identifier in response to transmitting the preamble.

According to an embodiment, the RACH configuration parameters may indicate a plurality of RACH resources for the LAA cell. According to an embodiment, LBT procedure may comprise sensing the LAA cell before transmitting the preamble. According to an embodiment, the configuration parameters may comprise one or more LBT parameters for the LBT procedure.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" is indicative that the phrase following the term "based on" is an example of one of a multitude of suitable possibilities that may, or may not, be employed to one or more of the various embodiments. The phrase "in response to" is indicative that the phrase following the phrase "in response to" is an example of one of a multitude of suitable possibilities that may, or may not, be employed to one or more of the various embodiments.

In this disclosure, various embodiments are disclosed. Limitations, features, and/or elements from the disclosed example embodiments may be combined to create further embodiments within the scope of the disclosure.

In this disclosure, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations.

For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using LAA communication systems. However, one skilled in the art will recognize that embodiments of the disclosure may also be implemented in a system comprising one or more TDD cells (e.g. frame structure 2 and/or frame structure 1). The disclosed methods and systems may be implemented in wireless or wireline systems. The features of various embodiments presented in this disclosure may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

The invention claimed is:

1. A method comprising:
receiving, by a wireless device from a first base station, at least one first message comprising:
configuration parameters for a plurality of cells comprising a plurality of cell groups comprising:
a first cell group for communication with the first base station; and
a second cell group for communication with a second base station, the second cell group comprising a licensed assisted access (LAA) cell; and
one or more random access channel (RACH) configuration parameters for a RACH of the LAA cell;
performing a listen before talk (LBT) procedure to transmit a preamble via the RACH of the LAA cell of the second base station in response to initiating a random access process with the second base station;
incrementing a counter in response to the LBT procedure indicating that the channel is occupied;
determining a failure of the random access process in response to the counter reaching a first value; and
transmitting, by the wireless device to the first base station, at least one second message in response to the failure of the random access process with the second base station, wherein the at least one second message comprises:
an indication of the failure of the random access process with the second base station; and
one or more parameters indicating that at least one LBT failure occurred during the failed random access process.

2. The method of claim 1, wherein the failure of the random access process is due to a first number of LBT failures during the random access process.

3. The method of claim 2, wherein the configuration parameters comprise the first number.

4. The method of claim 1, further comprising incrementing the counter in response to not receiving a random access response (RAR) within a RAR window in response to transmitting the preamble, wherein the preamble is transmitted in response to the LBT procedure indicating a clear channel.

5. The method of claim 4, wherein the RAR window starts at a subframe that contains an end of the preamble transmission plus a first predetermined number of subframes.

6. The method of claim 4, wherein the one or more RACH configuration parameters comprise the RAR window.

7. The method of claim 4, further comprising monitoring a control channel associated with a random access radio network temporary identifier in response to transmitting the preamble.

8. The method of claim 1, wherein the one or more RACH configuration parameters indicate a plurality of RACH resources for the LAA cell.

9. The method of claim 1, wherein the LBT procedure comprises sensing the LAA cell before transmitting the preamble.

10. The method of claim 1, wherein the configuration parameters comprise one or more LBT parameters for the LBT procedure.

11. A wireless device comprising:
one or more processors; and
memory storing instructions that, when executed by the one or more processors, cause the wireless device to:
receive from a first base station, at least one first message comprising:
configuration parameters for a plurality of cells comprising a plurality of cell groups comprising:
a first cell group for communication with the first base station; and
a second cell group for communication with a second base station, the second cell group comprising a licensed assisted access (LAA) cell; and
one or more random access channel (RACH) configuration parameters for a RACH of the LAA cell;
perform a listen before talk (LBT) procedure to transmit a preamble via the RACH of the LAA cell of the second base station in response to initiating a random access process with the second base station;
increment a counter in response to the LBT procedure indicating that the channel is occupied; and
determine a failure of the random access process in response to the counter reaching a first value;
transmit, to the first base station, at least one second message in response to the failure of the random access process with the second base station, wherein the at least one second message comprises:
an indication of the failure of the random access process with the second base station; and
one or more parameters indicating that at least one LBT failure occurred during the failed random access process.

12. The wireless device of claim 11, wherein the failure of the random access process is due to a first number of LBT failures during the random access process.

13. The wireless device of claim 12, wherein the configuration parameters comprise the first number.

14. The wireless device of claim 11, wherein the instructions, when executed by the one or more processors, further cause the wireless device to increment the counter in response to not receiving a random access response (RAR) within a RAR window in response to transmitting the preamble, wherein the preamble is transmitted in response to the LBT procedure indicating a clear channel.

15. The wireless device of claim 14, wherein the RAR window starts at a subframe that contains an end of the preamble transmission plus a first predetermined number of subframes.

16. The wireless device of claim 14, wherein the one or more RACH configuration parameters comprise the RAR window.

17. The wireless device of claim 14, wherein the instructions, when executed by the one or more processors, further cause the wireless device to monitor a control channel associated with a random access radio network temporary identifier in response to transmitting the preamble.

18. The wireless device of claim 11, wherein the one or more RACH configuration parameters indicate a plurality of RACH resources for the LAA cell.

19. The wireless device of claim 11, wherein the LBT procedure comprises sensing the LAA cell before transmitting the preamble.

20. The wireless device of claim 11, wherein the configuration parameters comprise one or more LBT parameters for the LBT procedure.

* * * * *